United States Patent
El Homsi

(10) Patent No.: US 7,945,464 B2
(45) Date of Patent: *May 17, 2011

(54) WORKFLOW SYSTEM MATRIX ORGANIZATION SEARCH ENGINE

(75) Inventor: Alexandre El Homsi, Paris (FR)

(73) Assignee: International Business Machines Corporation, Armonk, NY (US)

(*) Notice: Subject to any disclaimer, the term of this patent is extended or adjusted under 35 U.S.C. 154(b) by 889 days.

This patent is subject to a terminal disclaimer.

(21) Appl. No.: 11/758,778

(22) Filed: Jun. 6, 2007

(65) Prior Publication Data

US 2008/0222147 A1    Sep. 11, 2008

Related U.S. Application Data

(63) Continuation of application No. 09/828,710, filed on Apr. 6, 2001, now Pat. No. 7,373,310.

(60) Provisional application No. 60/281,664, filed on Apr. 5, 2001, provisional application No. 60/194,932, filed on Apr. 6, 2000.

(51) Int. Cl.
*G06Q 10/00* (2006.01)

(52) U.S. Cl. ..................................... 705/7.12

(58) Field of Classification Search ............... 705/8–10
See application file for complete search history.

(56) References Cited

U.S. PATENT DOCUMENTS

| | | | |
|---|---|---|---|
| 5,128,860 A | 7/1992 | Chapman | |
| 5,189,606 A | 2/1993 | Burns et al. | |
| 5,490,097 A | 2/1996 | Swenson et al. | |
| 5,774,661 A | 6/1998 | Chatterjee et al. | |
| 5,826,239 A | 10/1998 | Du et al. | |
| 5,842,173 A | 11/1998 | Strum et al. | |
| 5,870,545 A | 2/1999 | Davis et al. | |
| 5,874,954 A | 2/1999 | Kilmer et al. | |
| 5,890,133 A | 3/1999 | Ernst | |
| 5,911,134 A | 6/1999 | Castonguay et al. | |
| 5,937,388 A | 8/1999 | Davis et al. | |
| 6,003,021 A | 12/1999 | Zadik et al. | |
| 6,006,192 A | 12/1999 | Cheng et al. | |
| 6,041,306 A | 3/2000 | Du et al. | |
| 6,067,531 A | 5/2000 | Hoyt et al. | |
| 6,067,548 A | 5/2000 | Cheng | |

(Continued)

FOREIGN PATENT DOCUMENTS

WO    9827479 A2    6/1998

OTHER PUBLICATIONS

Homsi, U.S. Appl. No. 09/828,710, filed Apr. 6, 2001, Office Communication dated Apr. 6, 2005, 23 pages.

(Continued)

*Primary Examiner* — Jonathan G Sterrett

(74) *Attorney, Agent, or Firm* — Daniel McLoughlin; Hoffman Warnick LLC

(57) ABSTRACT

A rule-based search engine is used in conjunction with an automated network-based workflow system (which in turn is interfaced with an organizational database) to efficiently determine service routing requests from users/clients. The search engine employs search techniques adapted for use with multi-dimensional tree structures that define the matrix organizational model. Workflow services are preferably represented by roles that can be used to represent workflow actors in the workflow routing rules. These roles are preferably evaluated at run-time to best match recipients depending on the organization context from which the routing request is made.

15 Claims, 22 Drawing Sheets

U.S. PATENT DOCUMENTS

| | | | |
|---|---|---|---|
| 6,073,109 | A | 6/2000 | Flores et al. |
| 6,308,163 | B1 | 10/2001 | Du et al. |
| 6,327,362 | B1 | 12/2001 | Hull et al. |
| 6,349,238 | B1 | 2/2002 | Gabbita et al. |
| 6,349,320 | B1 | 2/2002 | Emberton et al. |
| 6,405,215 | B1 | 6/2002 | Yaung |
| 6,519,568 | B1 | 2/2003 | Harvey et al. |
| 6,578,006 | B1 | 6/2003 | Saito et al. |
| 2001/0032108 | A1 | 10/2001 | Sieron et al. |
| 2003/0083917 | A1 | 5/2003 | Tracey et al. |

OTHER PUBLICATIONS

Homsi, U.S. Appl. No. 09/828,710, filed Apr. 6, 2001, Office Communication dated Sep. 9, 2005, 22 pages.

Homsi, U.S. Appl. No. 09/828,710, filed Apr. 6, 2001, Office Communication dated Feb. 15, 2006, 20 pages.

Homsi, U.S. Appl. No. 09/828,710, filed Apr. 6, 2001, Office Communication dated Jul. 20, 2006, 21 pages.

Homsi, U.S. Appl. No. 09/828,710, filed Apr. 6, 2001, Office Communication dated Jan. 17, 2007, 26 pages.

Homsi, U.S. Appl. No. 09/828,710, filed Apr. 6, 2001, Notice of Allowance and Fee(s) Due dated Apr. 5, 2007, 14 pages.

The Workflow Management Coalition Specification, "Workflow Management Coalition Terminology & Glossary", Feb. 1999, pp. 1-65, Copyright 1994-1999 Workflow Management Coalition.

Daft, "Management", 1991, 2nd Edition, Chapter 9, pp. 245-277, Copyright 1991.

Goldberg et al., "An Alliance of Business & Technology", Feb. 1994, pp. 1-8, Management Review, v83n2.

Grudin, "Groupware and Social Dynamics: Eight Challenges for Developers", Jan. 1994, pp. 1-27, Communications of the ACM v37n1.

Van Der Aaist, "The Application of Petri Nets to Workflow Management", 1988, pp. 1-53, The Journal of Circuits, Systems and Computers.

FIG. 5

| | | |
|---|---|---|
| NEW OBJECT | | CREATES A NEW OBJECT (FROM THE SAME OBJECT TYPE AS THAT WHICH IS PRESENTLY HIGHLIGHTED IN THE OBJECT STORE). FOR INSTANCE, IF AN ORGANIZATION UNIT OBJECT TYPE WERE HIGHLIGHTED IN THE OBJECT STORE, THIS BUTTON WOULD CREATE A NEW, UNNAMED ORGANIZATION UNIT IN THE DESIGN AREA. |
| EDIT | | EDITS THE CURRENTLY SELECTED OBJECT. WHEN SELECTED, A DIALOG BOX OPENS, SHOWING THE ATTRIBUTES OF THE SELECTED OBJECT. |
| DELETE | | DELETES THE CURRENTLY SELECTED OBJECT. |
| SAVE CHANGES | | COMMITS ALL CHANGES MADE TO THE ORGANIZATION DEFINITION. |
| SHOW ACTIONS | | DISPLAYS A LIST OF ALL ORGANIZATION CHANGES MADE SINCE THE LAST SAVE. |
| SHOW PEOPLE | | DISPLAYS A LISTBOX CONTAINING THE NAMES OF ALL PEOPLE WHO ARE DEFINED IN THE ORGANIZATION, WHETHER OR NOT THEY'VE BEEN ASSIGNED TO ORGANIZATION UNITS. |
| MORSE SEARCH | | PERFORMS A "MORSE SEARCH" TO TEST ROLE EVALUATION IN YOUR ORGANIZATION DEFINITION. IT IS NOT NECESSARY TO HAVE AN APPLICATION DESIGN OR EVEN A WORKFLOW PROCESS TO PERFORM A MORSE TEST. EVALUATION IS BASED SOLELY ON THE RELATIONSHIPS DEFINED IN THE VISUAL PLANNER (OR PLANNER DATABASE, FROM THE NOTES CLIENT). |
| NEW VIEW | | OPENS A NEW VIEW IN THE DESIGN AREA. VIEWS ARE TABBED AND LABELED ACCORDING TO THE NAME OF THE PARENT OBJECT IN THE VIEW. |
| CLOSE VIEW | | CLOSES THE CURRENT VIEW IN THE DESIGN AREA. |
| CLOSE ALL VIEWS | | CLOSES ALL OPEN VIEWS IN THE DESIGN AREA.<br><br>NEITHER OF THE TWO "CLOSE" OPTIONS WILL DISCARD CHANGES THE USER HAS MADE IN AN OPEN VIEW. SELECTING THE OPTION TO "SAVE" YOUR CHANGES WILL RETAIN ALL CHANGES MADE THROUGH THE VIEWING PANES, EVEN IF THE USER HAS SUBSEQUENTLY CLOSED THE VIEWS. |
| PRINTING AND SETUP | | THESE THREE BUTTONS IMPLEMENT THE STANDARD PRINTING FUNCTIONS – PRINT, PRINT PREVIEW, AND PAGE SETUP. |
| SHOW/HIDE PEOPLE | | DISPLAYS THE LIST OF ALL PEOPLE WHO ARE ASSIGNED TO EACH ROLE, WITHIN EITHER A FUNCTIONAL ROLE VIEW, HIERARCHICAL ROLE VIEW OR AN ORGANIZATION UNIT VIEW. |
| SHOW/HIDE FUNCTIONAL LINK | | DISPLAYS THE NAMES OF THE FUNCTIONS THAT ARE PROVIDED, ALONG FUNCTIONAL LINKS. FOR INSTANCE, IF A RED LINE EXISTS BETWEEN TWO ORGANIZATIONS (INDICATING A FUNCTIONAL LINK), CLICKING ON THIS BUTTON WILL DISPLAY THE NAMES OF THE FUNCTIONS SHARED BETWEEN TWO ORGANIZATIONS TO BE DISPLAYED. |
| SHOW/HIDE WATCHER | | DISPLAYS A MINIATURE VIEW OF THE ORGANIZATION OR ROLE TREE IN THE UPPER RIGHT CORNER OF THE DESIGN AREA. THIS FUNCTIONALITY IS MOST USEFUL WHEN VIEWING/CREATING A LARGE TREE IN THE DESIGN AREA THAT DOES NOT FIT IN THE STANDARD DESIGN WINDOW. FROM THE WATCHER, YOU CAN POSITION YOUR MAIN VIEWING WINDOW TO OTHER PARTS OF THE TREE, JUST BY MOVING THE VIEW PORT WITHIN THE WATCHER. |
| ZOOM | | ZOOMS IN OR OUT ON THE VIEW, IN INCREMENTS OF 25% UP OR DOWN. THE PRESENT "ZOOM LEVEL" IS DISPLAYED TO THE RIGHT OF THE ZOOM OUT BUTTON. |

| BUTTON | FUNCTION |
|---|---|
| ORGANIZATION ELEMENTS 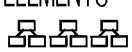 | ADDS ORGANIZATION ELEMENTS TO THE ACTIVE VIEW WITH A SIMPLE DRAG-AND-DROP OPERATION (CLICKING AND HOLDING, THEN DRAGGING THE OBJECT TO THE ACTIVE VIEW IN THE DESIGN AREA). <br><br> PLACING THE LEFTMOST ICON IN THE DESIGN AREA CREATES A NEW ORGANIZATION UNIT/VIEW; PLACING THE CENTER ICON IN THE DESIGN AREA CREATES A NEW HIERARCHICAL ROLE/VIEW; AND, PLACING THE RIGHTMOST ICON IN THE DESIGN AREA CREATES A NEW FUNCTIONAL ROLE/VIEW. <br><br> IN ANY GIVEN VIEW, ONLY ONE TYPE OF ITEM MAY BE MAINTAINED. FOR INSTANCE, AFTER YOU HAVE CREATED A NEW ORGANIZATION UNIT IN THE CURRENT VIEW, THE OTHER TWO ORGANIZATION ELEMENTS ARE INACTIVATED FOR THAT VIEW. |
| HIERARCHICAL LINK  | DEFINES A HIERARCHICAL LINK BETWEEN "CHILD" AND "PARENT" ORGANIZATION ELEMENTS. <br><br> HIERARCHICAL LINKS ARE ADDED BY DRAGGING THE LINK OBJECT TO THE "CHILD" AND DROPPING (THE ORGANIZATION ELEMENT WILL CHANGE BACKGROUND COLOR WHEN A LINK IS RECOGNIZED), FOLLOWED BY CLICKING ONCE ON THE "PARENT" ELEMENT. |
| FUNCTIONAL LINK  | DEFINES FUNCTIONAL LINKS BETWEEN ORGANIZATION UNITS, AND IS THEREFORE ACTIVATED ONLY WHILE IN AN ORGANIZATION UNIT VIEW. <br><br> FUNCTIONAL LINKS ARE ADDED WITH THE SAME DRAG-AND-DROP OPERATION AS WITH THE HIERARCHICAL LINK (ABOVE). THE FIRST ITEM THAT YOU DROP THE LINK ONTO BECOMES THE "SERVICED" OR "CLIENT" ORGANIZATION, AND THE SECOND ORGANIZATION UNIT, WHERE THE LINK IS TERMINATED, BECOMES THE "SERVICING" ORGANIZATION. |

FIG. 6

WORKFLOW SYSTEM MATRIX ORGANIZATION SEARCH ENGINE

CROSS-REFERENCE TO RELATED APPLICATIONS

The present application is a continuation of and currently allowed U.S. patent application Ser. No. 09/828,710, filed 6 Apr. 2001 now U.S. Pat. No. 7,373,310, which claims the benefit of U.S. Provisional Application Nos. 60/281,664, filed 5 Apr. 2001 and 60/194,932, filed 6 Apr. 2000, each of which is incorporated herein.

TECHNICAL FIELD

The present invention relates generally to the field of workflow software, and in particular to an automated workflow system that includes a matrix organization search engine.

BACKGROUND OF THE INVENTION

Workflow is generally defined as a series of tasks within an organization to produce a final outcome. In particular, workflow, as defined by the Workflow Management Coalition®, is the automation of a business process, in whole or in part, during which documents, information, or tasks are passed from one participant to another for action, according to a set of procedural rules.

A workflow management system, as defined by the Workflow Management Coalition®, is a system that defines, creates, and manages the execution of workflows through the use of software, running on one or more workflow engines, which is able to interpret the process definition, interact with workflow participants and, where required invoke the use of information technology (IT) tools and applications Therefore, a workflow model is a description of how different tasks are sequenced in a business process and who performs these tasks. Since tasks involve information that is exchanged between people or systems, it is necessary to extend this definition to include the data that is being exchanged. From this explanation we can define three separate components of most workflow models:

Organization (e.g., who does what and who knows what in the organization?)
Process (e.g., what are the tasks and how are they sequenced?)
Application (e.g., what data is to be exchanged?)

Any number of organizational data sets, business processes or applications can be used in a single workflow process, and further, these components may be re-used in any number of workflow processes.

Sophisticated workgroup computing applications facilitate defining different workflows for different types of jobs. For example, in a publishing setting a document may be automatically routed from writer to editor to proofreader to production. At each stage in the workflow, one individual or group is responsible for a specific task. Once the task is complete, the workflow system ensures that the individuals responsible for the next task are notified and receive the data they need to execute their stage of the process. Some of the common workflow systems include FLOWMARK® and POWERFLOW®, available from International Business Machines and Percussion Software, respectively.

IBM FLOWMARK® is a workflow management system that helps organizations to define, document, test, control, execute, and improve their business processes. Furthermore, it helps define control flow and data flow via a graphical interface, thereby avoiding writing of code. Flowmark is usually used in conjunction with Lotus NOTES®.

Percussion POWERFLOW® is a tool for adding workflow logic to any Lotus Domino® application via a graphical interface. POWERFLOW also performs statistical analysis on business processes, POWERFLOW requires a Domino server (4.5 or above).

The business world has long recognized the benefits of employing workflow systems to automate internal business processes. By defining an internal process and automating the flow of information, these tools have improved the way business is done. Paper-intensive, manual tasks, such as expense reporting or claims processing, have been replaced with a more efficient workflow model. In addition, with the growing emphasis on electronic business enterprise strategies, workflow technology has also become the integration platform to support business-to-business (i.e., external) relationships, as well as internal processes.

As companies have recognized the benefits of workflow enabled electronic document exchange, several workflow automation tools have emerged in the market. These tools are widely employed, despite their inherit weaknesses. One limitation of most workflow tools is that even though they allow companies to implement workflow processes, they fail to provide a good platform-independent solution. Furthermore, corporate re-organizations and employee turnover are frequent events in today's business world. In order to compete in the expanding global market, companies must be able to adapt to changing organization structures. Another limitation of traditional workflow tools is that they suffer from lengthy implementations—both a direct cost and an opportunity cost in today's fast-paced electronic business economy. Secondly, and perhaps most importantly, most tools are often too complex for the typical business user to administer. That is, specialized IT personnel are often required to implement, maintain and troubleshoot workflow enabled technology—either because relationships are hardcoded in the workflow tool, or because the technology is embedded in a more complex application. When IT personnel administer the applications, the business-users' input in the business event becomes limited. It is easy to see how the benefit of business-user's input into improving the process and responding more quickly to changes in the organization is lost when the business-user has no direct control or oversight of the business event.

Conventional automated workflow tools generally provide descriptions of an organizational structure that are cumbersome to modify to account for organizational changes and have limited organizational modeling ability. For example, prior art systems allow fewer dimensions of organizational definition, and significantly, they fail to provide the ability to define easily referenced functional roles with the organization. Another shortcoming is seen in cases where the added dimensions can be defined, but cannot be identified "in context". As an example, a functional role of "Direct Supervisor" should not yield the same result for all personnel within an organization. The correct, contextual answer varies depending upon the person for whom that relative role is being resolved. The prior art also lacks the ability to provide "functional links" between organization units. These links allow a portion of an organization tree/sub-tree to be made available as a provider of some service or function to another sub-tree that is part of a completely different organization (e.g., a different company engaged to provide out-sourced services).

Therefore, there is a need for a system that provides the ability to provide functional links between organizational units, and allows organizational changes to be made easily and to be correctly modeled by the automated workflow system.

Furthermore, there is a need for a tool that allows a business(es) to build and maintain web enabled workflow solutions to support electronic business applications, as well as business-to-business relationships. Furthermore, it is beneficial to have an enterprise workflow tool that provides a clear separation between the application, the processes and the organization. The present invention provides for an easily implemented, maintained and administered workflow model that maximizes user group control, and can dynamically adapt to changes in the enterprise.

SUMMARY OF THE INVENTION

An automated workflow system includes a matrix organization search engine that interfaces with an organizational database to service routing requests from users/clients. The matrix organization search engine is rules based system that provides workflow routing in response to a client request. The search engine employs search techniques adapted for use with multi-dimensional tree structures that define the organizational model. The matrix organizational model is multidimensional with axes comprising an organizational unit, a title hierarchy, and functional roles. This multidimensional structure combined with an intelligent search engine provide for an automated workflow system.

The present invention also allows workflow services to be rendered to external organizations such as partners, suppliers, distributors and customers. Workflow services are preferably represented by roles that can be used to represent workflow actors in the workflow routing rules. These roles are preferably evaluated at run-time to best match recipients depending on the organization context from which the routing request is made.

Although the present invention has been shown and described with respect to several preferred embodiments thereof, various changes, omissions and additions to the form and detail thereof, may be made therein, without departing from the spirit and scope of the invention.

BRIEF DESCRIPTION OF THE DRAWINGS

FIGS. 5 and 6 collectively illustrate the functionality associated with the buttons in the system and object toolbars of the Visual Planner;

DETAILED DESCRIPTION OF THE INVENTION

Figure 1:
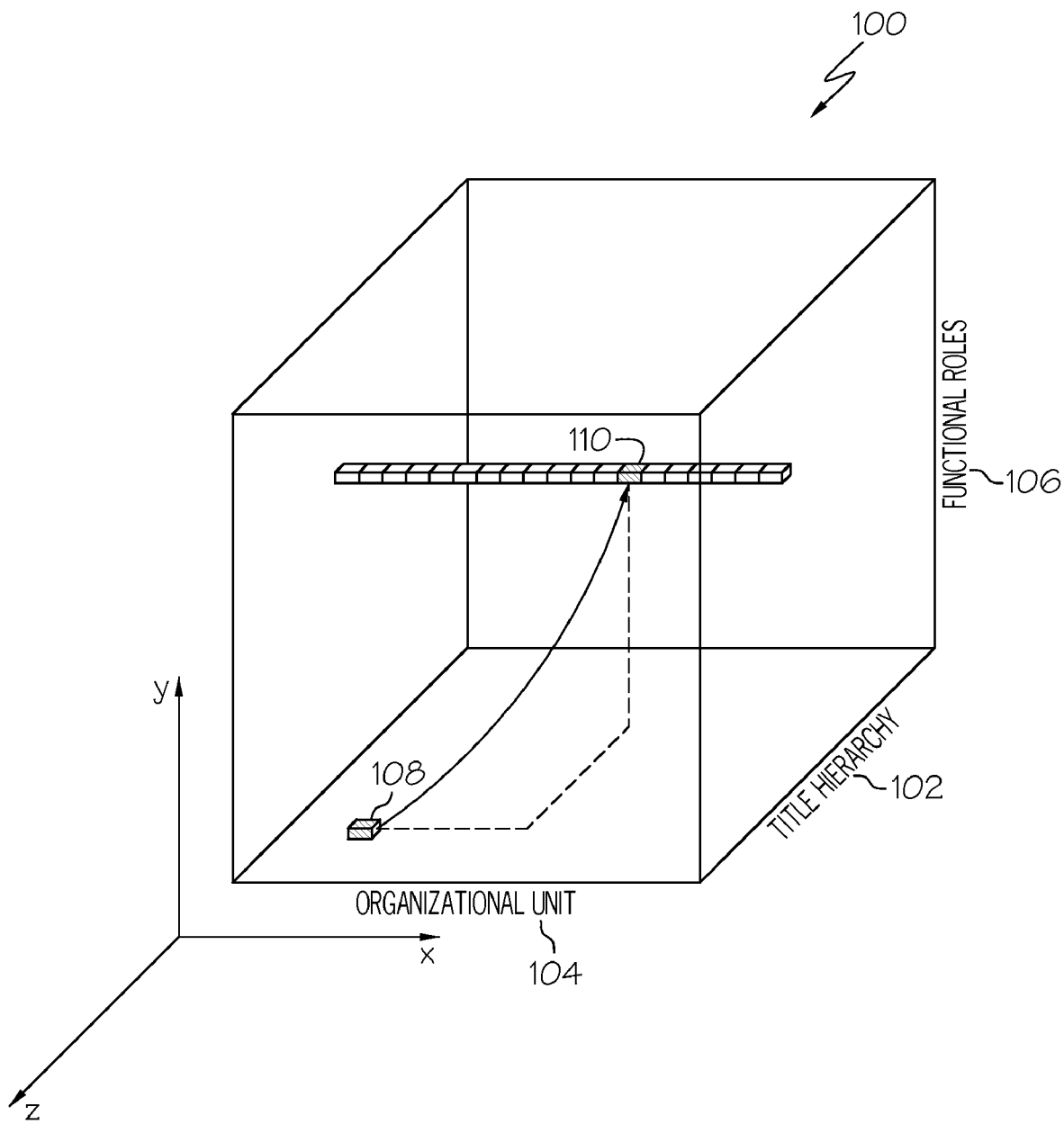
FIG. 1 illustrates three dimensions associated with a preferred embodiment of a matrix organizational model.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated specifications for its construction and is not intended to limit the invention to the embodiment illustrated. Those skilled in the art will envision many other possible variations within the scope of the present invention.

Matrix Organization Model and MORSE Specification

1. Multidimensional Tree Structure Theory 1.1 Matrix Theory General Definitions

Positive Integer: Any integer greater than or equal to 0.

Oriented Link: Given the two elements x and y, x→y denotes an oriented link from x to y. Furthermore, x is referred to as the source of the oriented link, and y as the destination of the oriented link.

Function Composition: Given three set elements E, F, and G, functions P and Q are defined as P:E→F (a function P from E to F) and Q:F→G (a function Q from F to G). Function PoQ verifies the following:

For each x in E, PoQ(x)=P(Q(x))

Additionally, it should be noted that $P^n(x)$ is the function PoPo . . . oP n times, where n is a positive integer, with the convention that $P^0(x)$=x for all x.

Tree Dimension: Given a finite set of elements E, a tree Dimension of E is a function P:E→E that verifies the following:

For each element x of E, there is one and only one P(x) and P(x) belongs to E.

There is one and only one element called P-root, where P(P-root)=P-root, and for each element of x of E, there is an integer n that verifies $P^n(x)$=P-root.

Parent Element: Given a finite set of elements E, and P, a tree dimension of E, there is one and only parent element P(x) for any element x of E.

Sub-dimension: Given the two tree dimensions F and G, G is a sub-dimension of F if for any two elements x, y of E verifying y=F(x), we have y=G(x).

Super-dimension: Given the two tree dimensions F and G, F is a super-dimension of G if G is a sub-dimension of F.

Tree: For any given F, a tree dimension of E, the finite set of elements of E is called a tree for that given tree dimension.

Sub-Tree: Given E, a hierarchical tree, and x an elements of E, we call sub-tree of root x, $S(x)$ the set of elements y for which there is k positive integer verifying $H^k(y)=x$.

Path: Given a tree E, and two elements of E, x and y, $P:x \to y$ is a path from x to y if elements $x^1, x^2, \ldots, x^n$ are found, and for all k between 1 and n−1, $x^k \to x^{k+1}$ is either a hierarchical or functional link. A path can involve multiple tree dimensions.

Hierarchy: An arbitrary tree dimension of E is called a hierarchical tree dimension, which by convention is a super-dimension of all other tree dimensions. The resulting tree defined on E is called hierarchy. From here on, H is referred to as this hierarchical tree dimension, and all other tree dimensions F are designated functional tree dimensions. By convention, F is a sub-dimension of H. This also defined a hierarchy on the set of tree dimensions of E, where H is the root element.

Minimal Dimension: Given a finite hierarchy of tree dimensions F1, F2, ..., and Fn, Fk is a minimal dimension if Fk is not a super-dimension of any of the other tree dimensions.

Hierarchical Link: Given a hierarchy E, and a hierarchical tree dimension H defining this hierarchy, for all x in E, $x \to H(x)$ is an oriented link called hierarchical link.

Functional Link: Given a tree E and a functional tree dimension F defining this hierarchy, for all x in E, $x \to F(x)$ is an oriented link called functional link.

Hierarchical Path: A path where all oriented links are hierarchical links.

Functional Path: A path where all oriented links are functional links.

Sub-function: Given two functional tree dimensions F and G, G is a sub-function of F if G is a sub-dimension of F.

Super-Function: Given two functional tree dimensions F and G, F is a super-function of G if G is a sub-function of F. Note that the hierarchy function H is a super function of all functions.

Well-formed Path: A well-formed path is any given path $P:x \to y$, where components $x^1, x^2, \ldots, x^n$ are found, where $x^1=x$, $x^n=y$ and for all k between 1 and n−1, $x^k \to x^{k+1}$ is either a hierarchical or functional link with the following constraints:

If $x^k \to x^k+$ is a functional link then for all m>k, $x^m \to x^m+1$ is a functional link.

If $x^k \to x^k+1$ is a functional link for a functional tree dimension F and $x^{k+1} \to x^{k+2}$ is a functional link for a functional tree dimension G, then G is a sub-function of F.

The minimal dimension M in this well-formed path defines the link $x^{n-1} \to x^n$.

Therefore, the minimal dimension is identified in the notation of a well-formed path by $P(M):x \to y$. Note that any hierarchical path is a well-formed path.

Optimal Path: Given two elements x and y, the optimal path is the shortest well-formed path for a given minimal dimension M, $P(M):x \to y$, shortest meaning that the number of elements $x^1, x^2, \ldots, x^n$, where $x^1=x$, $x^n=y$ defining that path is minimum.

1.2 Theorems and Preliminary Results

Theorem 1: For any given finite set of E, there is at least one tree dimension of E. T-Set(E), the set of all the tree dimensions of E is therefore not empty.

If $x^1, x^2, \ldots, x^n$ are all the elements of E, then the function P defined by:

$P(x^1)=x^1$ and $P(x^k)=P(x^{k-1})$ for k<1 is a tree dimension of E where $x^1$ is the root.

Theorem 2: For any given finite set E, and P a tree dimension of E, if A and B are two subsets of E, then $P(A \cup B)=P(A) \cup P(B)$.

If x belongs to A or B, then P(x) belongs to P(A) or P(B).

Given y an element of $P(A) \cup P(B)$, y belongs to either P(A) or P(B), which means there is x in either A or B verifying $P(x)=y$, then y belongs to $P(A \cup B)$.

Theorem 3: For any given finite set E, and P a dimension tree of E, if n is the total number of elements in E, then each element x of E verifies $P^n(x)=P$-root.

If $x^1, x^2, \ldots, x^n$ are all elements of E, assuming $x^1=P$-root, all $x^k$ where k>1 verify $P(x^k)<>x^k$.

Also assuming there is a minimal s positive integer verifying $P^s(x^k)=x^k$, we consider the set $\{xk, P(x^k), \ldots P^{s-1}(x^k)\}$. P-root does not belong to the latter set, as otherwise there would be a positive integer m verifying $P^m(P\text{-root})=x^k<>x^1=P\text{-root}$. Furthermore, if m is a positive integer verifying $P^m(x^k)=P$-root (by definition of P as a tree dimension), then there are two positive integers k and r where m=ks+r with r<s, and therefore $P^s(x^k)=x^k$, $P^m(x^k)=P^r(x^k)=P$-root which conflicts with the fact that P-root does not belong to $\{x^k, P(x^k), \ldots, P^{s-1}(x^k)\}$. Finally, if $P^n(x^k)<>P$-root then there would be n different elements in $\{x^k, P(x^k), \ldots, P^{n-1}(x^k)\}$ and P-root does not belong to that set either, which would make E have at least n+1 elements contradicting out initial assumption.

Theorem 4: For any given finite set E, and P a Tree Dimension of E, PoP is a tree dimension of E.

PoP(P-root)=P(P(P-root))=P(P-root)=P-root.

If x belongs to E, P(x) belongs to E and therefore P(P(x)) belongs to E.

If x, y belongs to E and PoP(x)<>PoP(y) then P(x)<>P(y) and x<>y.

If n is the total number of elements in E, for each element i in E, $(PoP)^n(x)=P^n o P^n(x)=P$-root.

Theorem 5—Transitive linking: Given two paths: $Px \to y$ and $P:y \to z$, $P:x \to z$ is also a path.

Theorem 6—Path inheritance in a sub-tree: Given a sub-tree $S(x)$ of a tree E, y is an element that does not belong to $S(x)$, and $Px \to y$ a path, then according to the previous result for any element z of $S(x)$, there is a path $P:z \to y$. Therefore, a sub-tree inherits all the paths available from its root element.

Theorem 7—Well-formed path inheritance in a sub-tree: Given a sub-tree $S(x)$ of a tree E, y an element that does not belong to $S(x)$, and $P(M):x \to y$ a well-formed path, then for any element z of $S(x)$, $P(M):z \to y$ is a well formed path, by definition of a well-formed path.

Theorem 8—Implicit Functional Tree Dimension: For any given element y, the union of all elements x where there is a well-formed pat $P(M):x \to y$ for a minimal functional tree dimension M, is a tree for that tree dimension, y being the root element. The result is obtained by definition of a well-formed path and the fact that the hierarchy is a super-function of all functions. Although some elements are linked by super-functions of M, they can be considered as implicitly linked by M itself.

2. Specification of a Matrix Organization Model

Definitions are given below to help understand the matrix organization model of the present invention, and are not meant to limit their interpretation or user thereof. Thus, other known definitions or equivalents may be substituted without departing from the scope of the present invention.

Resource: Any logical representation of a particular purpose. Any given resource will have at least one role.

Organizational Unit (OU): Any logical grouping of resources. An OU represents the hierarchical organizational model for an enterprise. The OU usually reflects the current structure of cost centers/profit centers.

Organizational Hierarchy: Given a finite set of OU's E, E is an organization hierarchy if the function hierarchically reports to is a tree dimension of E. This particular tree dimension is by convention the hierarchical tree dimension of E. The topmost OU is the root element of an organization hierarchy and the parent element of another OU (Parent OU).

Hierarchical Role: Any role that is a logical representation of a hierarchical level between resources within the same organization hierarchy. In the model of the present invention, each resource is assigned one and only one hierarchical role. Therefore, a hierarchy of hierarchical roles establishes a hierarchy of resources. Therefore, a hierarchical role defines the level of authority in an organization and is often related to a person's title in an organization. A user has only one hierarchical role. Examples of hierarchical roles include, but are not limited to, Line Manager, CEO, Vice President, Director, or Staff.

Functional Role: Any non-hierarchical role that represents a particular function. In the model of the present invention, any resource may be assigned one or several functional roles, but this assignment is not mandatory. Whenever a resource is assigned a functional role, we assume that it can service all sub-functions of this functional role. Therefore, a functional role represents services and areas of expertise available within the organization. Users may be assigned several functional roles according to their skills or ability to render a certain type of service. Examples of functional roles include, but are not limited to, Accounts Payable, Engineering, Legal, etcetera.

Functional Organization Link: Given OU1 and OU2 (two different organizational units) and a functional role F, OU1 is serviced by OU2 for F establishes a functional tree dimension and subsequent functional link OU1→OU2 called functional organizational link. Therefore, functional links are used to define the scope of services provided by a servicing organization unit to a service, or "client" organization unit. Functional links are defined between organizational units. With functional links, the definition of an organization model can be extended to represent a "Matrix Organization" (defined below). For instance, functional links may be defined to designate pockets of expertise or service made available, from a single place or several places, to other departments within an organization.

Global Function of an OU: Given OU1 an organizational unit and a functional role F, OU1 services F without a serviced unit specification, establishes a functional tree dimension on all defined organization units. F is called a functional organization link.

Matrix Organization: Any given set of the above elements which involves functional organization link between organizational units.

3. Specification of the Matrix Organization Search Engine

The Matrix Organization Search Engine (MORSE) helps determine the next recipient of a business process. It does so by locating the right intersection of several organizational dimensions. FIG. 1 illustrates three dimensions associated with a preferred embodiment of the present invention's matrix organizational model 100, which is traversed by the MORSE. The three dimensions include:

Title Hierarchy 102—comprising job titles and relative weighting (e.g., CEO→VP→Director→Manager).

Organizational Unit 104—Comprising physical or business segmentation and hierarchy. (e.g., Corporate→South Region→Alabama Division).

Functional Roles 106—Indicates specialization or knowledge (e.g., Engineer, PhD, Plumber, Accounts Payable).

This is a significant distinction from prior art systems in that it is not a model based on tree flow, but rather the model of the present invention utilizes the matrix character for its model of work flow. As shown in FIG. 1, a resource can be passed from organizational unit 108 to a specific functional role 110 via a matrix flow (not limited to a tree based flow) as determined by the present invention's search engine (MORSE).

MORSE, as previously defined, is a rules-based system that provides workflow routing based on client requests. Therefore, MORSE allows intelligent resolution of the question, "Who gets this next?", by sending a resource to the right person based on the person making the request and the definition of the person to receive it.

For example, if a user submits an expense report, it might be specified that, on submission, it must be approved by the user's supervisor, and by a person above the user's supervisor. Thus, it is modeled such that only if both persons agree, an expense report proceeds to the next step. A sample MORSE syntax for this purpose is:

Route to: Line Manager, Line Manager(Line Manager)

This indicates routing to the requester's line manager, and to the line manager of that line manager. In other words, all choices made are relative to the individual making the request. MORSE is able to determine who both targets in the routing above should be, without regard to the complexity of the organization involved.

In addition, MORSE implements concepts called, "Service Unit" and "Servicing Unit", which provide for intelligent routing of requests across organizational unit boundaries. As an example, this allows requests destined for human resources to arrive where they should, even if the organizational unit from which this request is made contains no human resource personnel or expertise. In many organizations, specialized functions are provided on a shared service basis to avoid duplication of expertise and expense. Serviced/servicing unit specification, as implemented within MORSE, takes this into account and allows the specification and traversal of such an organizational structure.

More importantly, the ability to traverse organizational unit boundaries is be generalized to the crossing of organization boundaries themselves, and then to allow coordination of efforts between completely separate companies. For implementation of complex business-to-business processes, such a capability is needed and MORSE provides such a capability.

Therefore, given a matrix organization, a role F and a resource x, MORSE determines the list of resources in that matrix organization that fulfills F for x. There are several ways of researching the solution to this problem. One solution to this problem includes finding all resources that have the role F. However, this solution does not take into consideration the matrix organization model that has been defined in the earlier section. Moreover, if no resources have been assigned the role F, the list of resources to be allocated will be empty.

In short, one idea behind MORSE is to search for resulting resources with two constraints:

There is a logical relationship between x and the resulting resources.

The resulting list of resources should never be empty and should not contain x.

Hence, MORSE uses a sophisticated method exploiting multi-dimensional tree structure theory to search for well-formed paths between OUs for the role F, departing from the OU where x belongs to find resources. If no well-formed path is found for the role F, then MORSE considers a well-formed path for all super roles of F. In all cases, the role assignment for a resource in an OU will take precedence on the exploration of well-formed paths. The escalation process in the hierarchy when no well-formed paths are found for a given OU, will ensure the proper exploration of inherited well-formed paths.

Figure 2A:
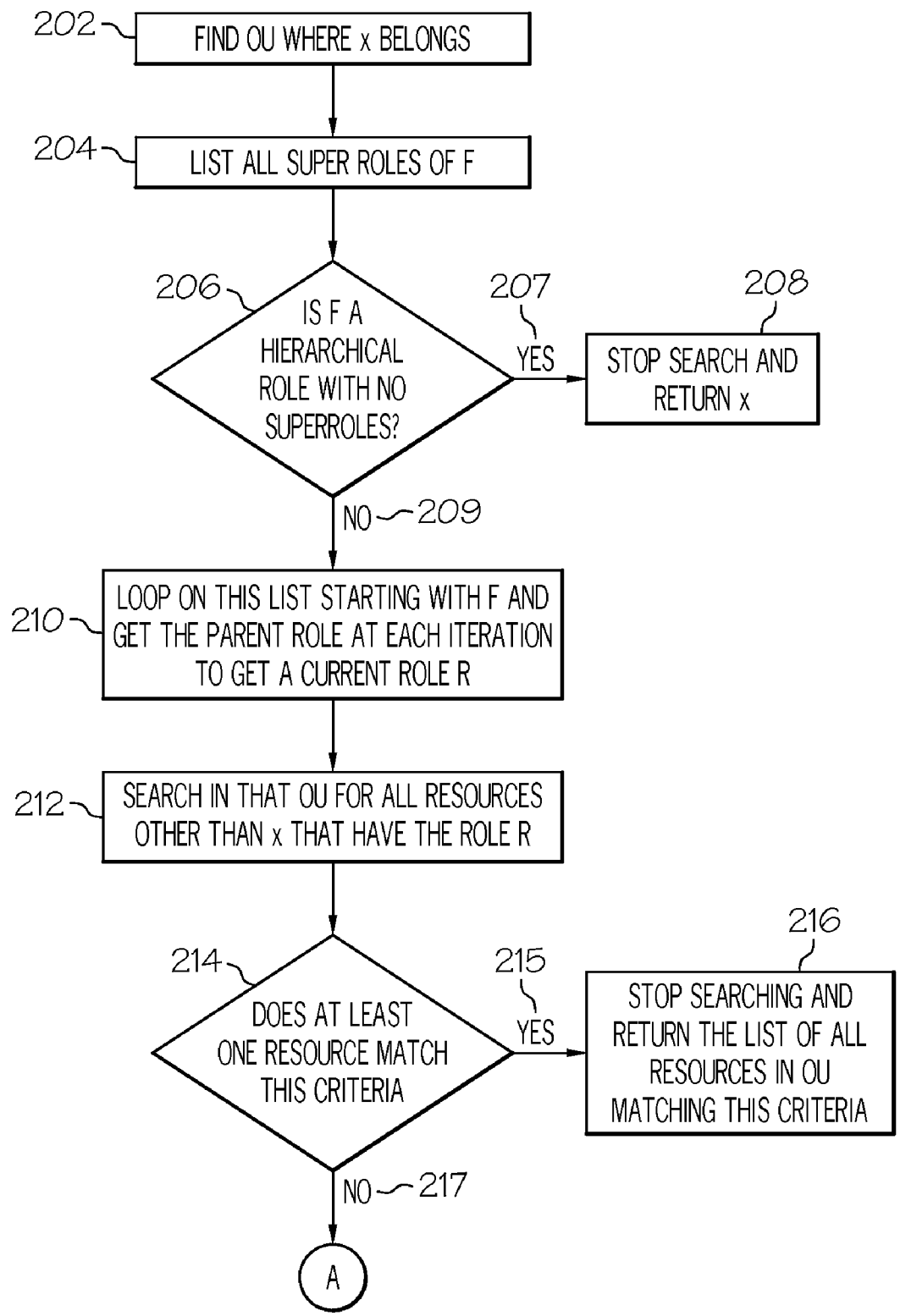
FIGS. 2a-c collectively illustrate a flowchart describing the best match algorithm utilized by MORSE of the present invention.
Figure 2B:
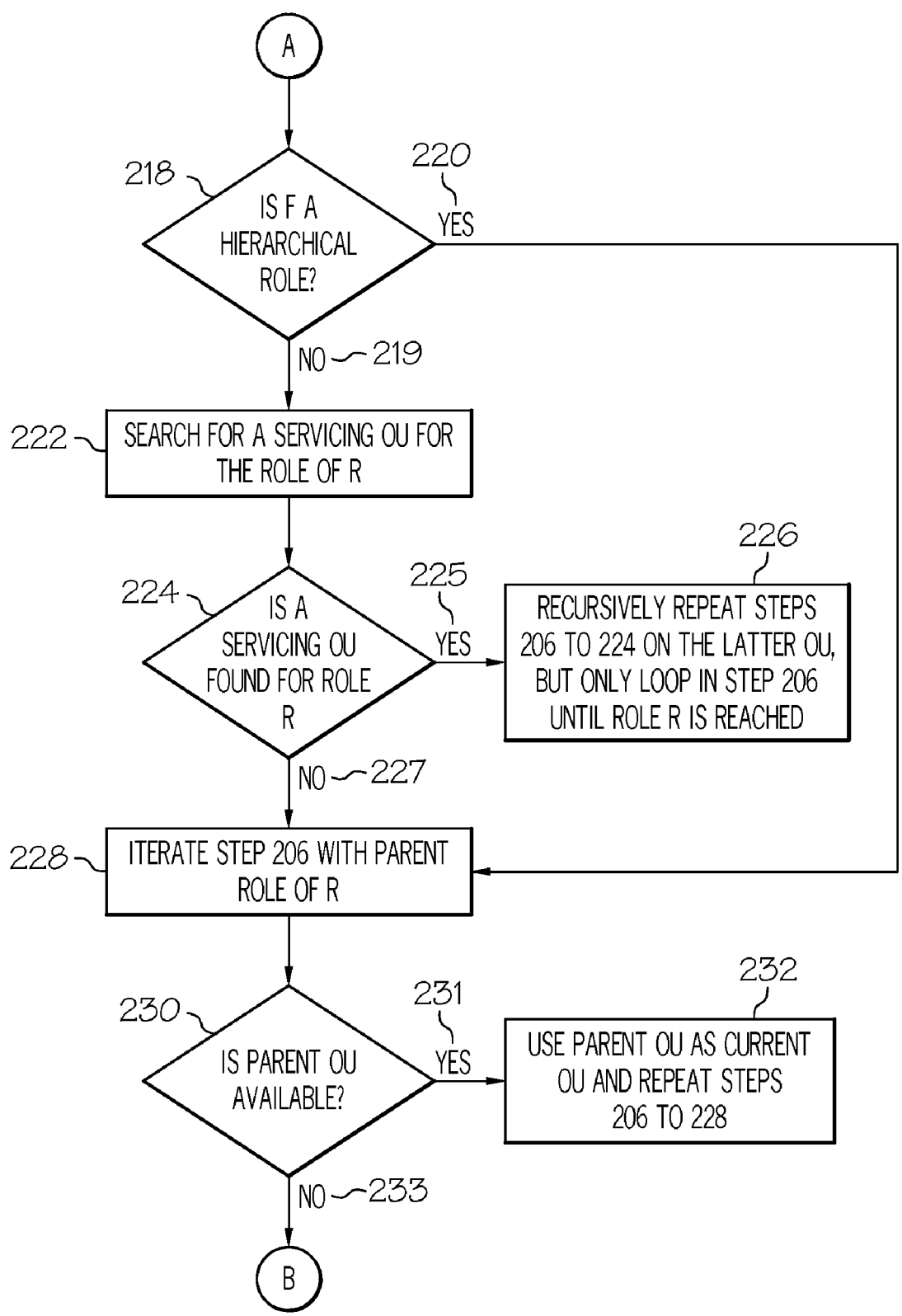
Figure 2C:
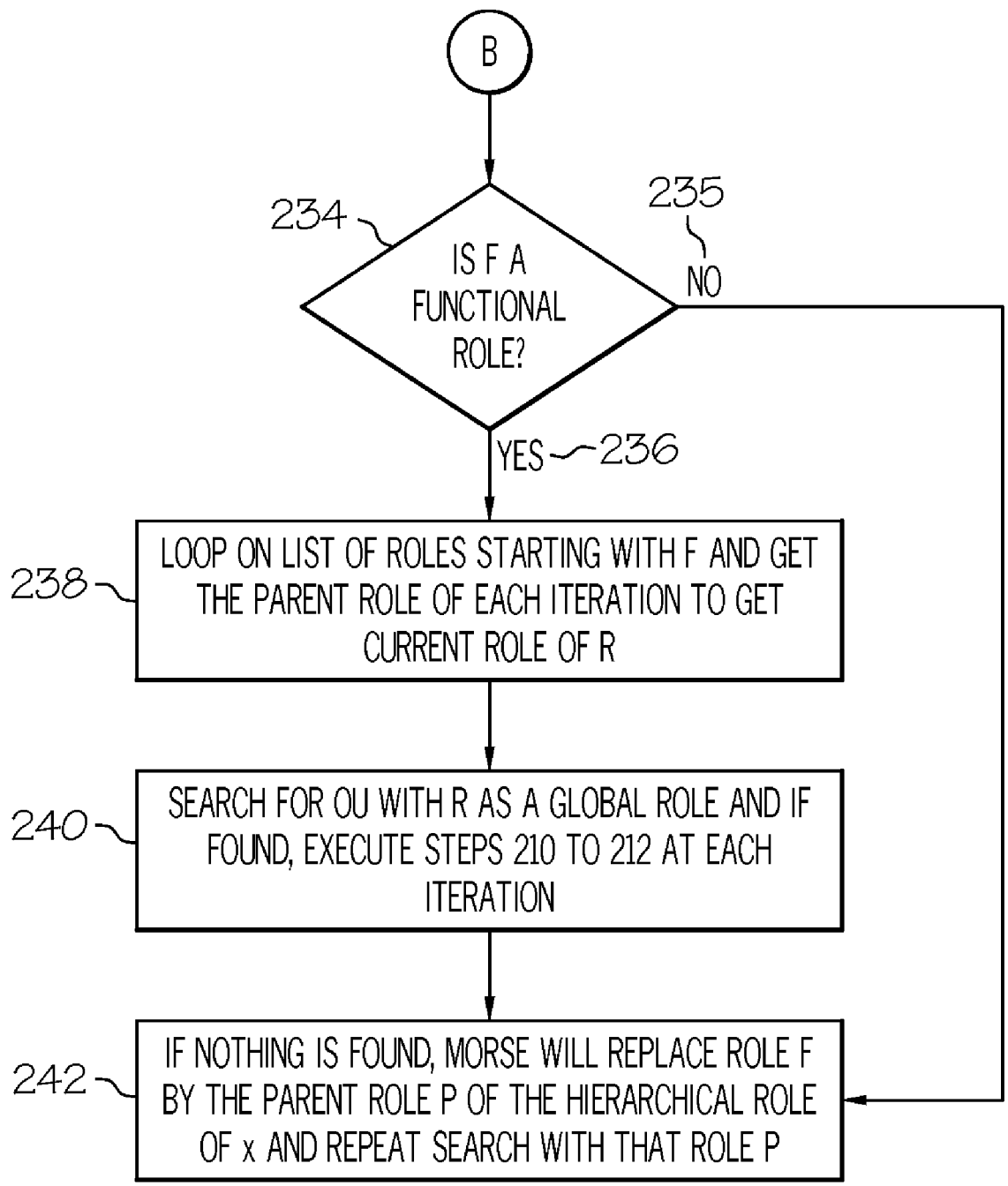

FIGS. 2a-c collectively illustrate a flowchart describing the best match algorithm utilized by MORSE of the present invention. Given a resource x, MORSE will search for best-match resources for the role F as follows:

1. Find OU where x belongs (step 202)
2. List all super roles of F (step 204).
3. A check (step 206) is performed to see if F is a hierarchical role with no super roles, and if x has this role (207), then stop searching and return x (step 208). Thus, in the case of F being a CEO of an organization, there are no super roles above this hierarchical role. Therefore, if x has this role, the searching is stopped and x is returned.
4. Otherwise (209), loop on the list of super roles, starting with F, and obtain the parent role during each iteration. This gives a current role R (step 210). Step 210 takes care of any functional inheritance scenarios.
5. Search in that OU for all resources other tan x that have the role R (step 212).
6. Check 214 is performed to see if at least one resource matches this criterion. If at least one match exists (215), searching is stopped and a list of all resources in that OU matching this criterion is returned (step 216).
7. If a resource is not found (217), a check 218 is performed to see if F is a hierarchical role. In the instance that F is a hierarchical role (220), then a skip is performed to step 228.
8. On the other hand, if no resource is found, then a search is performed for a servicing OU for the role R (step 222).
9. Next, check 224 is performed to see if a servicing OU is found for role R. If a servicing OU is found (225), then the search process is recursively repeated from steps 206 to 224 on the latter OU. To take into account the transitive linking scenario, in step 206, a loop is performed only until role R is reached.
10. If no servicing OU is found for role R (227), step 206 is repeated with the parent role of R (step 228).
11. Next, the hierarchy is escalated to a parent OU (path interference). Check 230 is then performed to see if a parent OU is available. If available (231), then the latter is used as the current OU, and steps 206 through 228 are repeated.
12. If no parent OU is available (topmost OU) (233), check 234 is performed to see if F is a functional role. If F is a functional role (236), then the list of roles are looped starting with F, and the parent role is obtained at each iteration. This gives a current role R (step 238). Next, a search is performed for OU with R as a global role, and upon a successful match, steps 210 and 212 are repeated at each iteration (step 240).
13. If nothing is found, MORSE will replace role F by the parent role P of the hierarchical role of x and repeat the search with the role of P (step 242).

Figure 3:
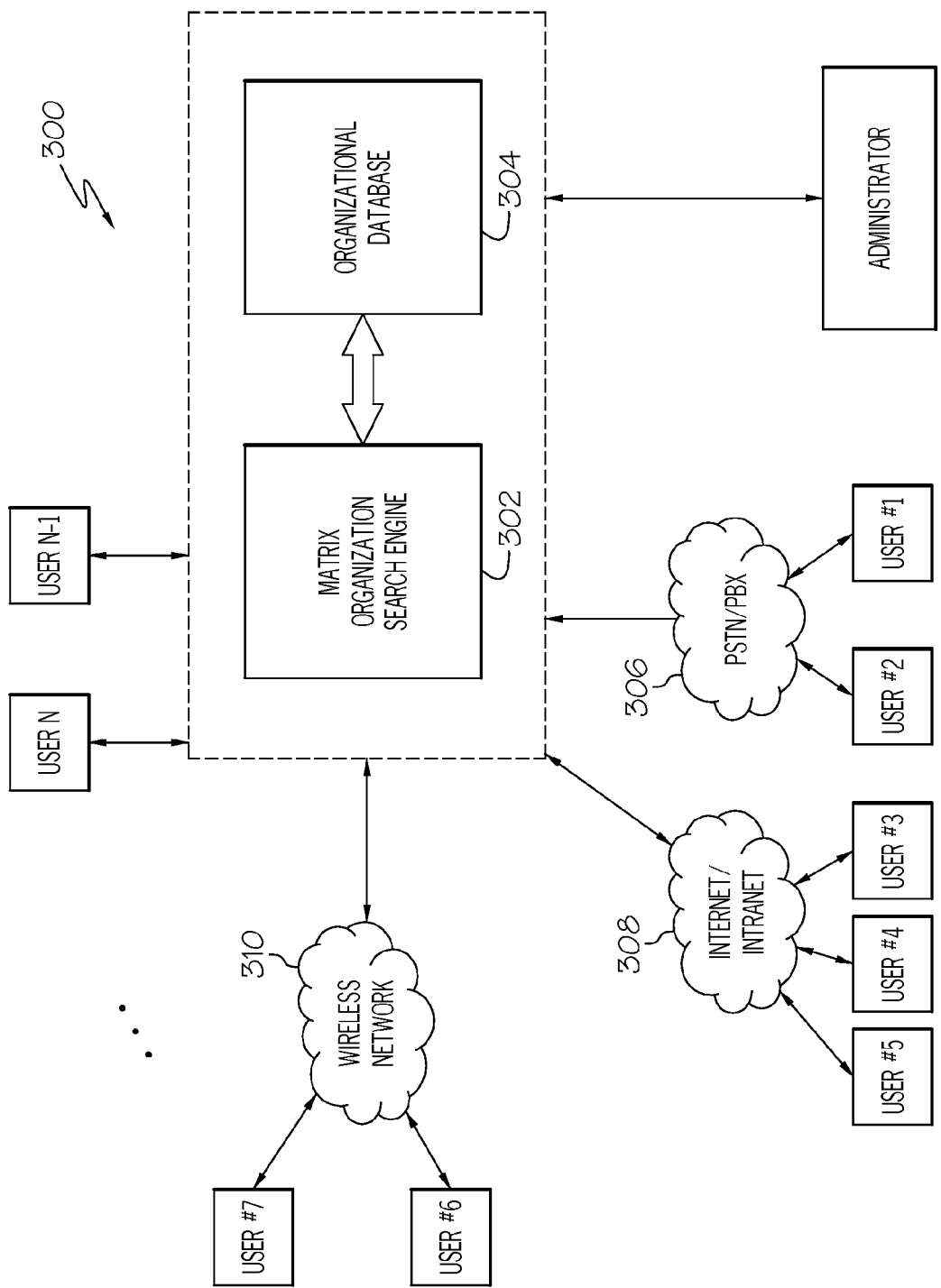
FIG. 3 illustrates an overview of automated workflow system that includes the matrix organization search engine.

FIG. 3 illustrates an overview of automated workflow system 300 that includes the above described matrix organization search engine 302, which interfaces with an organizational database 304 to service routing requests from user/clients. The user/clients access the workflow system via a network. Examples of networks include, but are not limited to, PSTN/PBX 306, Internet/Intranet 308, or wireless 310. Users provide workflow requests to system 300, and the requests are received by MORSE 302, which determines where the requests should be routed next in response to the type of request and the user who transmitted the request. Specifically, based upon the user who transmitted the request and the type of request, MORSE 302 accesses organizational database 304 to determine the user(s) to whom the request should be routed. Organizational database 304 described herein contains the multi-dimensional, doubly-linked tree matrix structure that models the business organization within which requests are serviced and routed.

MORSE is implemented as a part of Visual Planner®, a graphical toolset for organizational maintenance. A simple implementation of the Visual Planner interface is given in FIG. 4. The following list of screen components make up Visual Planner user interface 400:

Object Store 402: Stores defined organizational units, hierarchical roles and functional roles.

Design Area 404: View and create organizational models using the graphical tools.

Object Inspector 406: Update organization object properties.

View 408; View multiple organization elements/models using tabbed views.

System Toolbar 410: Edit, navigate, print, and view organization models. Includes the present invention's MORSE test to check role evaluation.

Object Toolbar 412: Drag-and-drop visual objects to create and define organization models.

FIGS. 5 and 6 collectively illustrate the functionality associated with the buttons in the system and object toolbars of the Visual Planner. FIG. 6 illustrates the buttons associated with the system toolbar that help in various navigational and editing features. On the other hand FIG. 6 illustrates the buttons associated with the object tool bar that help define matrix organizational models.

In most cases, the organization unit reflects the current hierarchy of cost centers (or profit centers) in the organization. However, users are able to define organization units that are purely functional and are only linked to the main corporate hierarchy through functional links. For example, a user is able to represent organization units in the Visual Planner which group people from external workflow participants, like distributors or suppliers.

Figure 4:
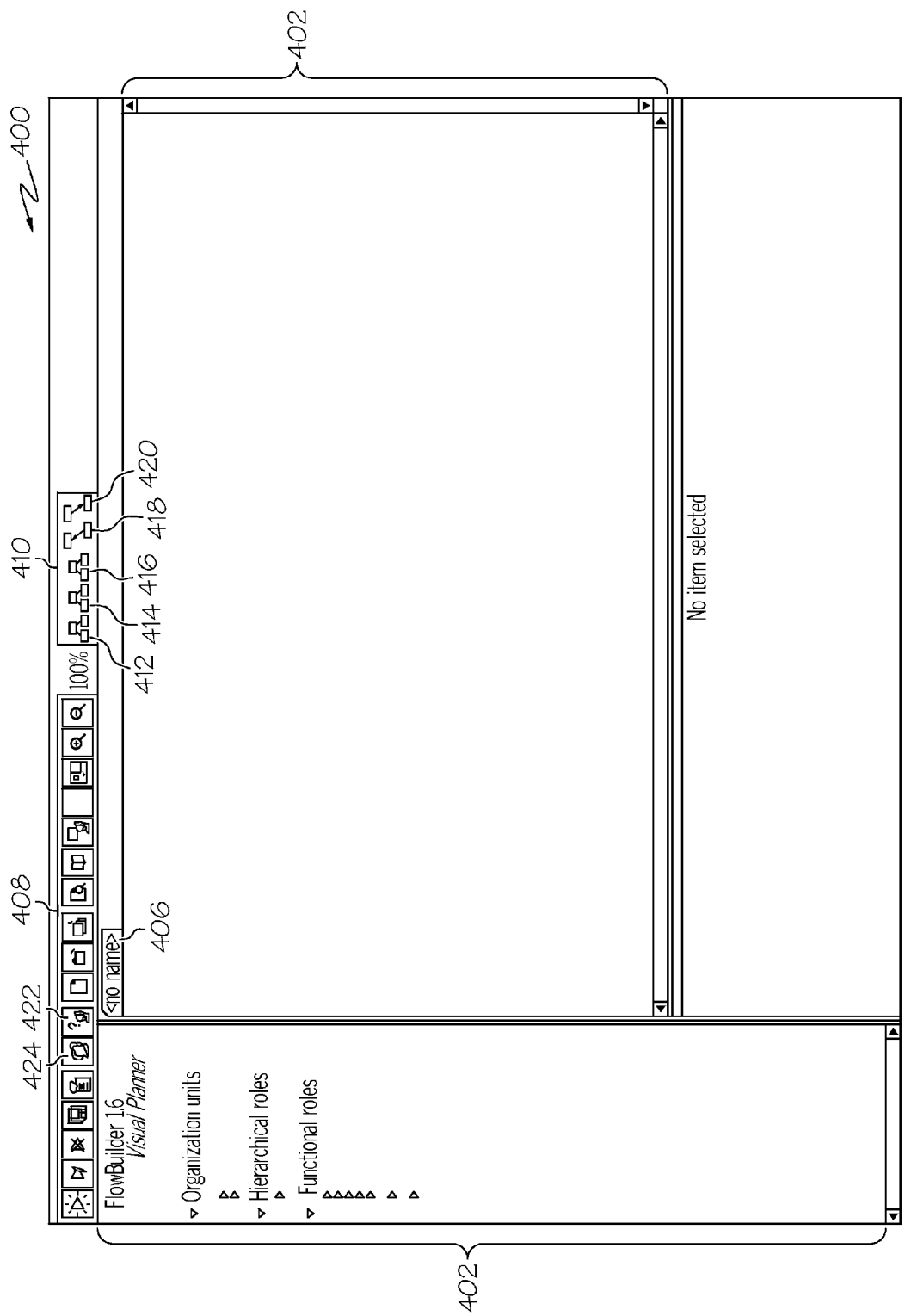
FIG. 4 illustrates a simple implementation of the Visual Planner interface.
Figure 7:
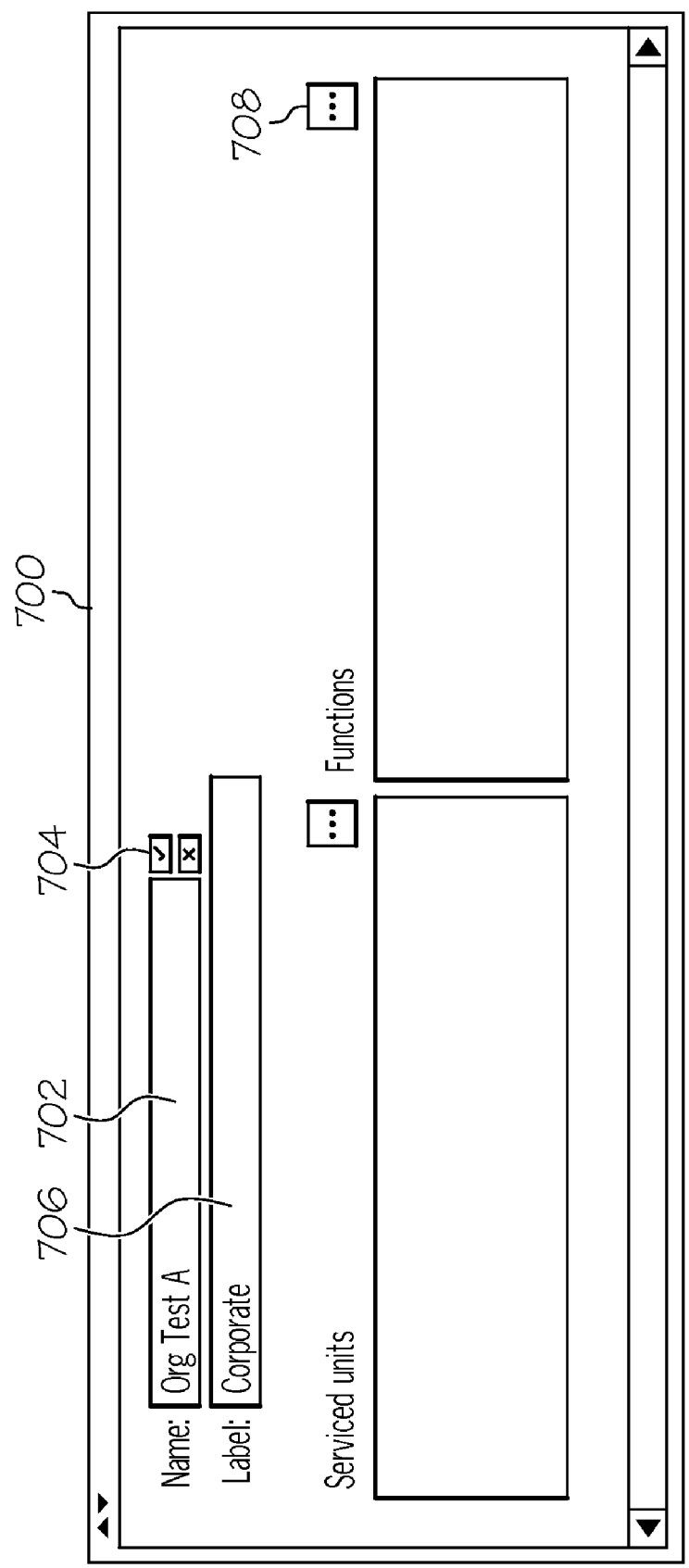
FIG. 7 illustrates an object inspector panel associated with the Visual Planner interface.

Therefore, as per FIG. 4, to define a new organization unit, the user must either already have an active window containing other organization unit elements or a new view. Selecting the organization unit icon (412) and dragging it down to design area (404), a new, untitled organization unit appears in the window. Now, users are able to double-click on the organization unit object in the design area to define its attributes. Thus, as shown in FIG. 7, upon double-clicking an organizational unit, object inspector panel 700 appears, wherein a user is able to define the attributes associated with the organizational unit.

To assign a name to the organization unit, a user types in a name in field 702 and clicks on icon 704 to validate the name. A check is performed to ensure that the typed name is not already in use. Next, the user assigns a label to the unit by typing a label in field 706. Labels are descriptive so that people interacting with the organization unit are able to recognize the functionality associated with the unit. By default, the label is displayed every time this organization is used. In the instance label field 706 is left blank, the name from name field 702 is displayed. It should be noted that the user is able to define functional links associated with the organization by clicking on the functions button 708, and selecting the functions the organizational unit needs to be associated with.

As discussed earlier, in the FlowBuilder organization model, roles are defined in two ways:

Hierarchical Roles represent authority level in the organization (e.g.,: CEO, Supervisor or Associate). Remember that a user can have only one hierarchical role assignment.

Functional Roles represent workflow services offered in the organization (e.g.,: Legal, Software, Development, Engineering or Benefit Administration).

Any role that is created may be a sub-role of an existing role, and may even have sub-roles itself. To create a sub-role of an existing role, the user simply draws a hierarchical link from the "parent" role to the "child" role. It should be noted that when defining sub-roles, a sub-role inherits all the characteristics of its parent role. Furthermore, hierarchical and functional role names must be unique, that is, no two roles may share the same name identifier.

Figure 8:
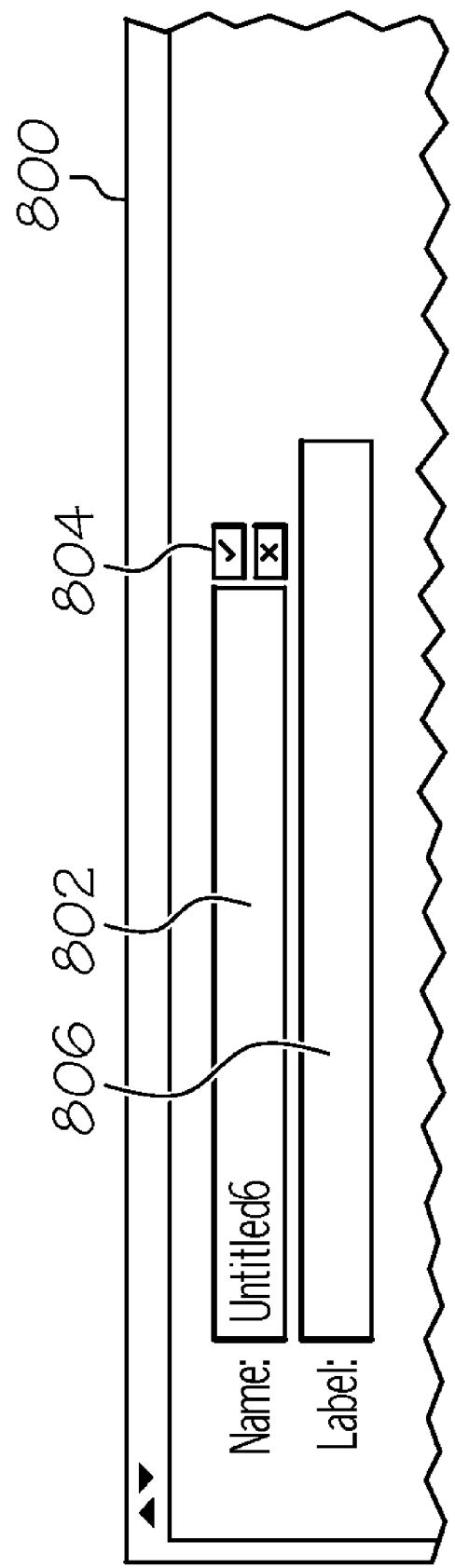
FIG. 8 illustrates an object inspector panel wherein a user is able to define the attributes associated with the object.

To define a new hierarchical role in the Visual Planner, a user must either already have an active window (containing other hierarchical role elements), or a new view. Next, the user selects the hierarchical role icon 414 (FIG. 4), and drags it down to design area 404 (FIG. 4). A new, untitled hierarchical role will appear in the window. The user then double-clicks on the hierarchical role object in the design area to define its attributes. Thus, as shown in FIG. 8, upon double-clicking a hierarchical role object, object inspector panel 800 appears, wherein a user is able to define the attributes associated with the object.

To assign a name to the hierarchical role, a user types in a name in field 802, and clicks on icon 804 to validate the name. A check is performed to ensure that the typed name is not already in use. Next, the user assigns a label to the role by typing a label in field 806. Labels are descriptive so that people interacting with the organization unit are able to recognize the functionality associated with the role. By default, the label is displayed every time this organization is used. In the instance label field 806 is left blank, the name from name field 802 is displayed. Once the user has defined a hierarchical role, icon 418 (in FIG. 4) is used to attach the role to a subsidiary to complete the description of the hierarchy.

Figure 9:
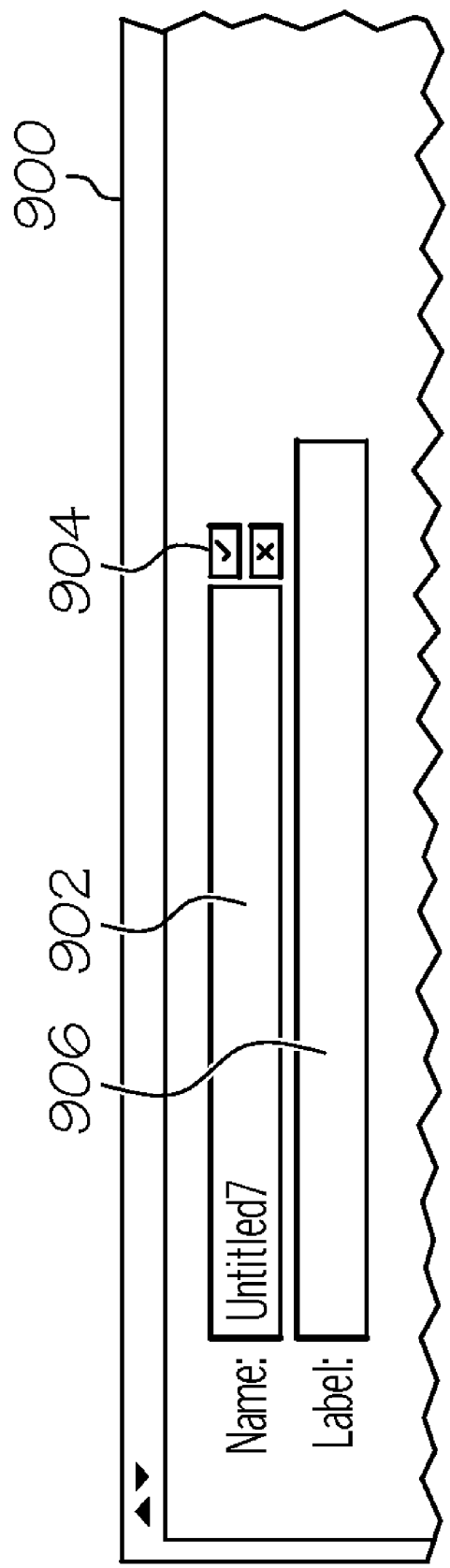
FIG. 9 illustrates another object inspector panel wherein a user is able to define the attributes associated with the object.

Similarly, to define a new functional role, a user must either already have an active window containing other functional role elements or a new view. Next, the user selects the functional role icon 416 (From FIG. 4), and drags it down to workspace 404 (FIG. 4). A new, untitled functional role appears in the window. Then the user double-clicks on the functional role object in the design area to define its attributes. Thus, as shown in FIG. 9, upon double-clicking a functional role object, object inspector panel 900 appears, wherein a user is able to define the attributes associated with the object.

To assign a name to the functional role, a user types in a name in field 902, and clicks on icon 904 to validate the name. A check is performed to ensure that the typed name is not already in use. Next, the user assigns a label to the role by typing a label in field 906. Labels are descriptive so that people interacting with the organization unit are able to recognize the functionality associated with the role. By default, the label is displayed every time this organization is used. When label field 906 is left blank, the name from name field 902 is displayed. Once the user has defined a hierarchical role, icon 420 (in FIG. 4) is used to attach the role to a subsidiary to complete the description of the hierarchy.

Therefore, functional links are used to define the workflow services that a certain organization unit (servicing unit) can render to other organization units (serviced units). From a business standpoint, the choice to define a functional link will be representative of the core competencies in an organization.

The MORSE algorithm roles and functional links to find service relationships in an organization. When defining functional links in an organization, given below are some of the principles assumed by MORSE:

A sub-unit is serviced by its parent service unit, if no other service (functional link) is defined for is sub-unit (inheritance).

Functional links can be used to override inherited links (exception handling).

MORSE follows as many links as needed to resolve service requests—first by traversing an organization unit's hierarchical tree, then by looking for functional links to other organizations providing the service requested (transitive linking)

If no functional links are defined between organization units, functional roles are applied only to subordinate organization units. In order to expand the scope of servicing relationships to other parts of the organization hierarchy or external organizations (creating virtual, or matrix organizations), functional links can be defined explicitly between the servicing organization (which contains the people with the assigned role) and the serviced (client) organization units.

Figure 10:
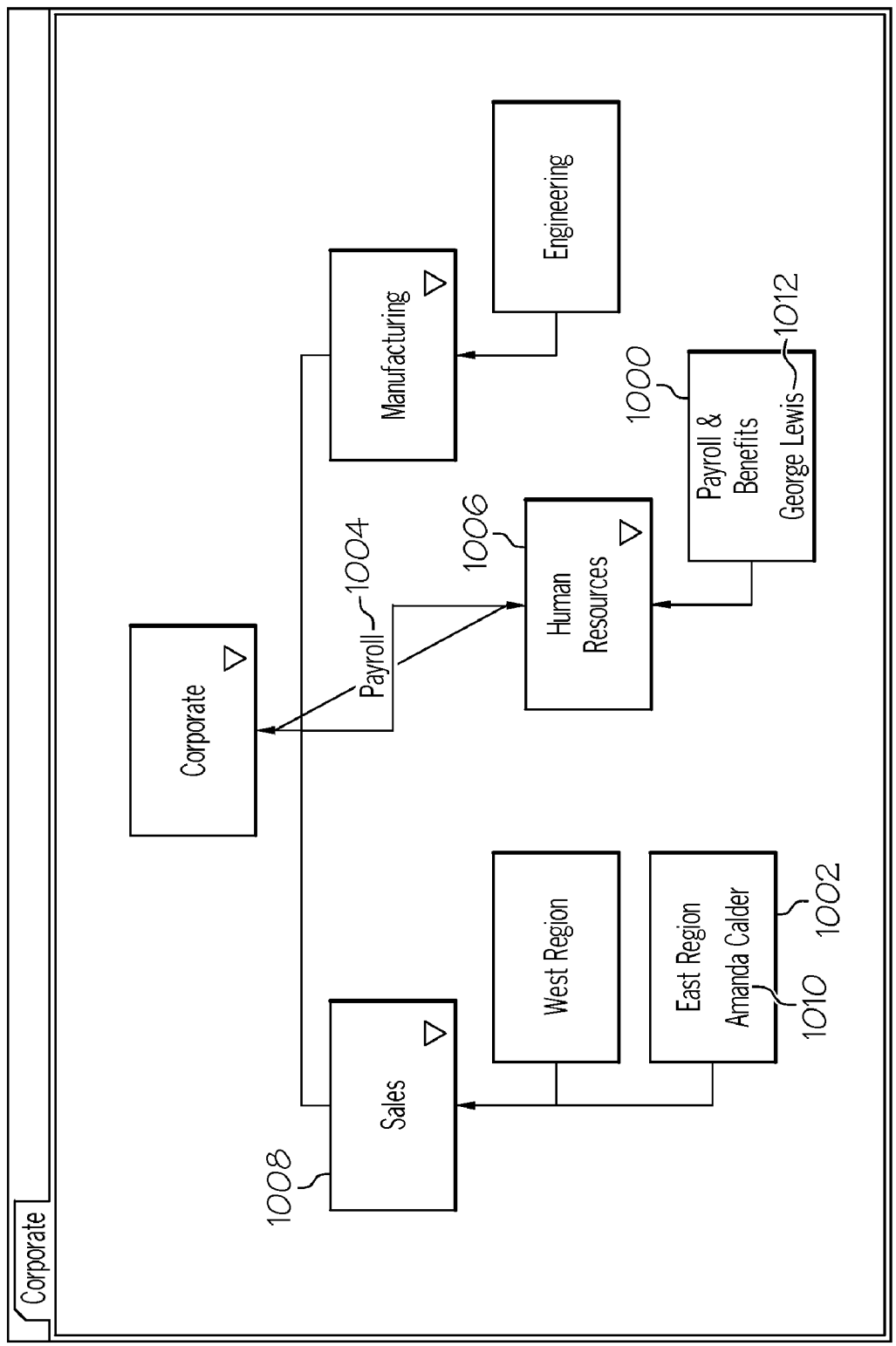
FIG. 10 illustrates how a functional link can create a servicing relationship between organization units.
Figure 11:
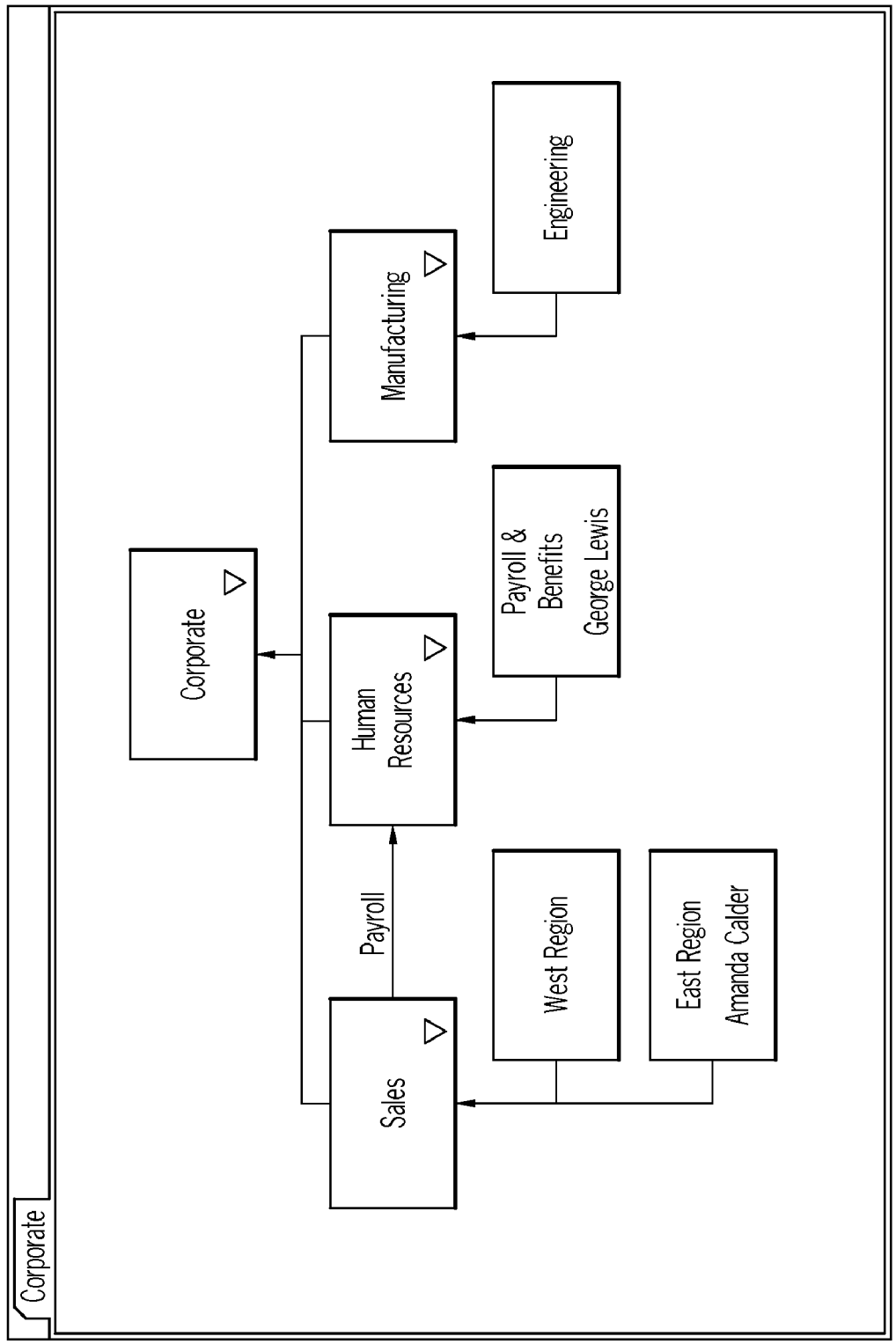
FIG. 11 illustrates this relationship between functional links and organizational units.

FIG. 10 illustrates how a functional link can create a servicing relationship between organization units. Notice that in FIG. 10 there are no defined relationships directly linking the organization units for "Payroll and Benefits" 1000 and "East Region" 1002. However, because functional link 1004 is defined at the top level of the organization unit, "Human Resource" organization unit 1006 is able to provide benefits administration services to all organization units defined under the "Sales" organization unit 1003. Thus, Sales unit 1002 employee Amanda Calder (1010) of "East Region" unit 1002 is able to make a payroll change request; since payroll is serviced by the employee George Lewis 1012, in "Payroll and Benefits" unit 1000, who also provides payroll service to all other organization units under 'Corporate' (i.e., has the functional role "payroll"). FIG. 11 illustrates this relationship between Amanda Calder of "East Region" unit and George Lewis of "Payroll and Benefits" unit though the Payroll link.

Figure 12:
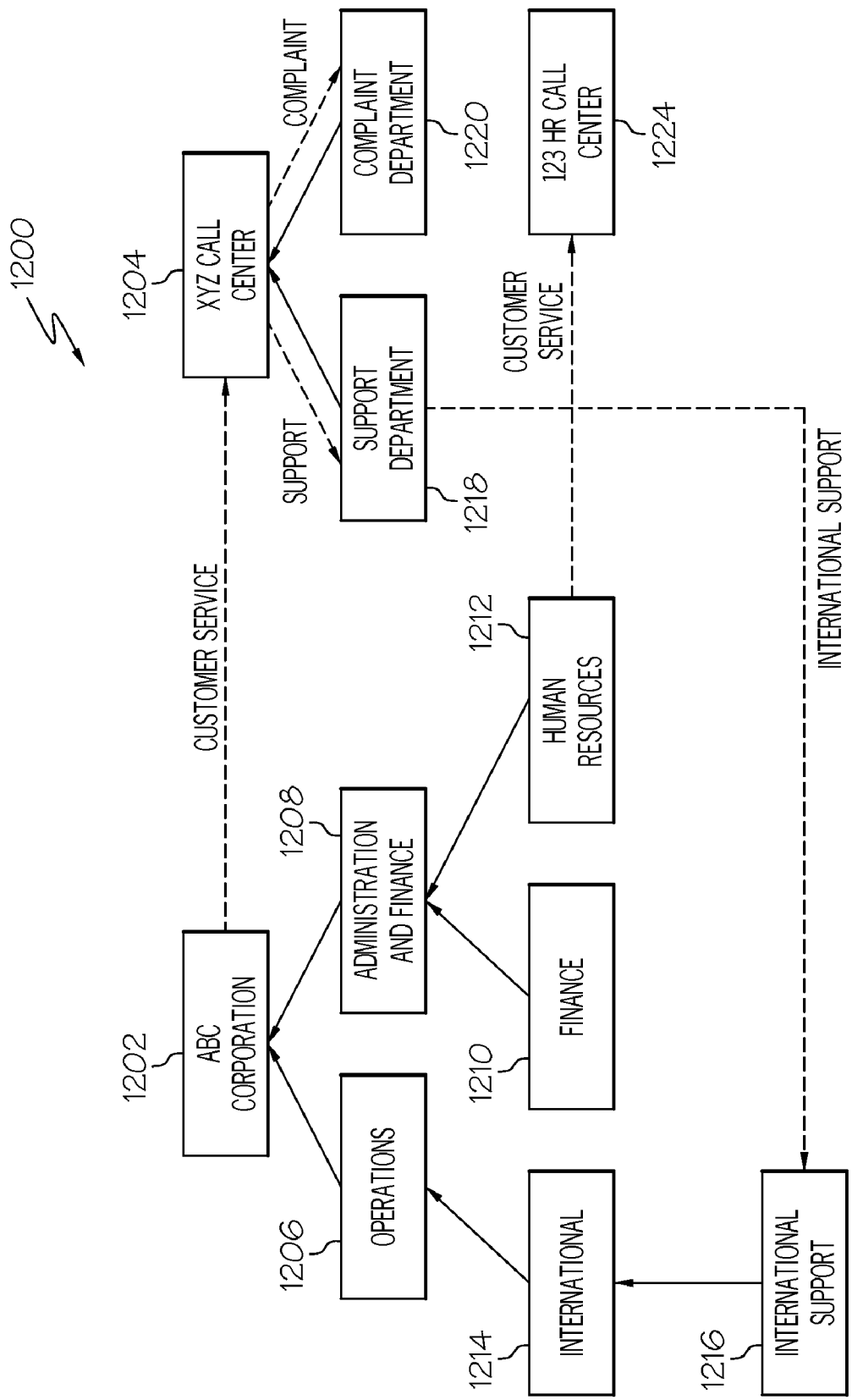
FIG. 12 illustrates a block diagram illustration of an organizational model that is resident in the organizational database of FIG. 3.

As another example, FIG. 12 is a block diagram illustration of an organizational model 1200 that is resident in the organizational database 304 of FIG. 3. The model may define the organization: (i) hierarchically, (ii) based upon organizational units and (iii) based upon functional roles. As shown in FIG. 12, the organization is defined based upon its organizational units and functional roles between organization units, and even different corporate entities. Model 1200 includes two corporate entities, ABC Corporation 1202 and XYZ Call Center 1204. Each of these entities has a distinct organization unit structure. For example, ABC Corporation 1202 includes the organization units "Operations" 1206 and "Admin & Finance" 1208. The Admin & Finance Group includes organizational units "Finance" 1210 and "Human Resources" 1212. The organizational unit "Operations" 1206 includes the org unit "International" 1214, which in turn includes the organizational unit "International Support" 1216.

The "XYZ Call Center" organizational unit 1204 includes the organizational units "Support Department" 1218 and "Complaint Department" 1220.

In addition to the "ABC Corporation" 1202 and the "XYZ Call Center" 1204 organizational units, a third entity "123 HR Call Center" 1224 is also defined in the organizational model.

Referring still to FIG. 12, solid lines represent organizational reporting links, while broken lines represent functional links. For example, if a workflow segment specifies routing to "Support" from the International organization unit within the ABC Corp organization structure, that request will be routed to the XYZ Call Center due to the functional link drawn, at the highest level, between ABC and XYZ. Specifically, the search engine would resolve requests for "Support" in the following order. "Is there a person with the "Support" function within the International organization?" If not, is there a direct functional link from International to another organization? If so, go search that organization for a person the "Support" functional attribute. A workflow segment is a discrete process represented as an object within a visual design tool, while a request is an item that is directed somewhere based upon that segment.

If there is not a person with the support function within the international organization, the hierarchy of functional roles is traversed looking for a "super role", or a role higher in the functional role tree, and tested to see if a person with that functional role exists in the international organization. If a person does not exist, escalation is made up the organizational hierarchy within ABC Corp, to Operations, and all the previous tests performed again, until either a person is found who meets the criteria, or the top of the tree is reached.

In the example provided, at the top of the tree for ABC the functional link from ABC to XYZ would be followed. After any such traversal, the system will always provide precedence to an exact match on functional role requested, and if none is found, it will again escalate up through the hierarchy of functions.

Figure 13:
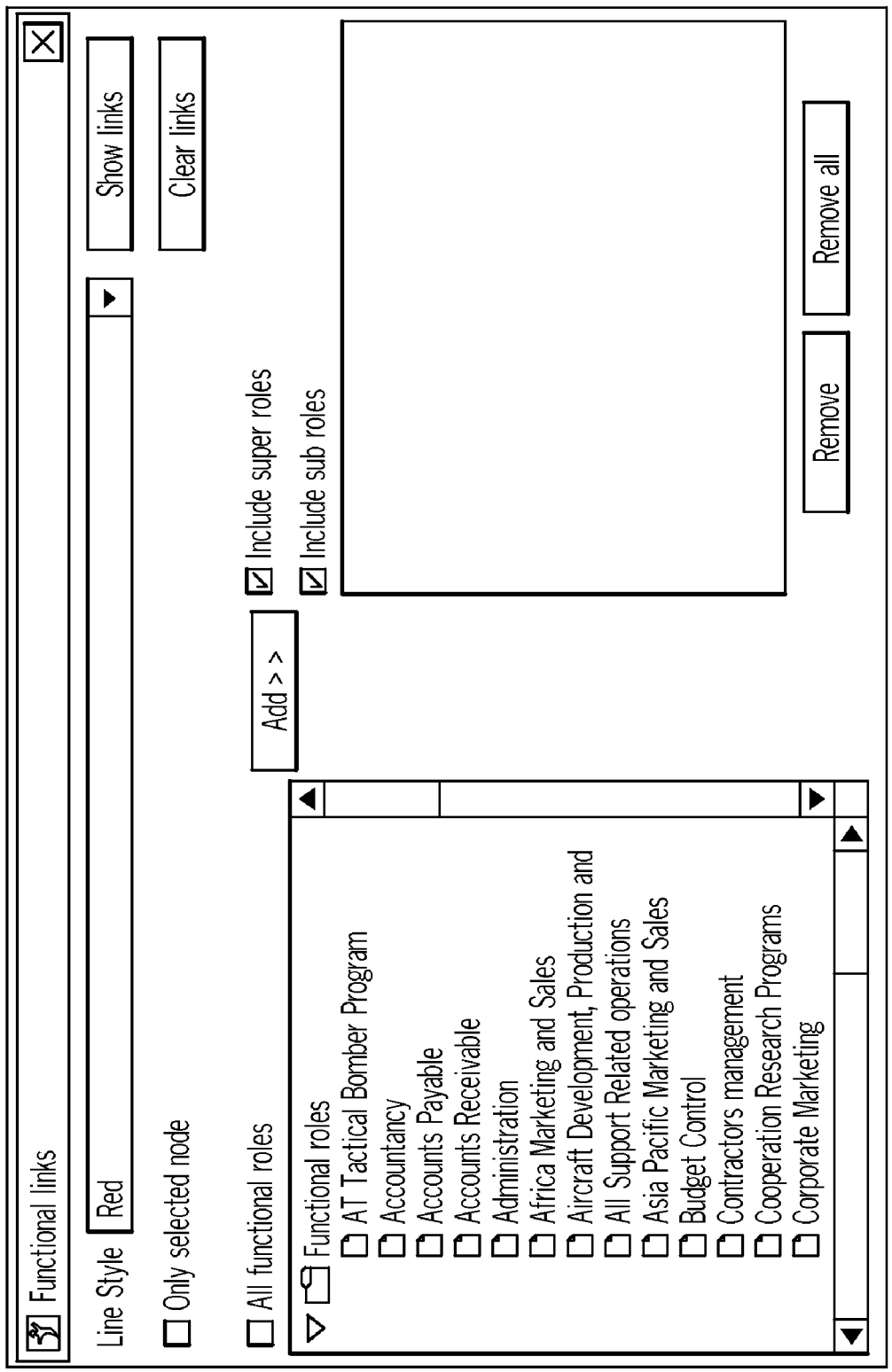
FIG. 13 illustrates the functional links window in the visual planner interface.

In the worst case, the result of this search yields the person at the top of the hierarchy of functions within the topmost organization unit in a given organization structure tree. It should also be noticed that the same function may be serviced by two different units depending on the requesting organization unit Going back to the Visual Planner interface, a user is able to define a functional link by right clicking on an organization unit object in the design area. Next, the user chooses the option, "Show Links", from the drop down menu. When creating a functional link, the users are asked to specify the services provided by the servicing unit to its client. This request for specification occurs in a dialog box similar in form to the one shown in FIG. 13. One of the advantages of the Visual Planner interface is the ability to search for and evaluate specific roles in a matrix hierarchy.

Another advantage of MORSE testing is to identify weak links in an organization model thereby saving time and cost associated with troubleshooting. Evaluation is performed solely on the relationships defined in the FlowBuilder Planner.

Figure 14:
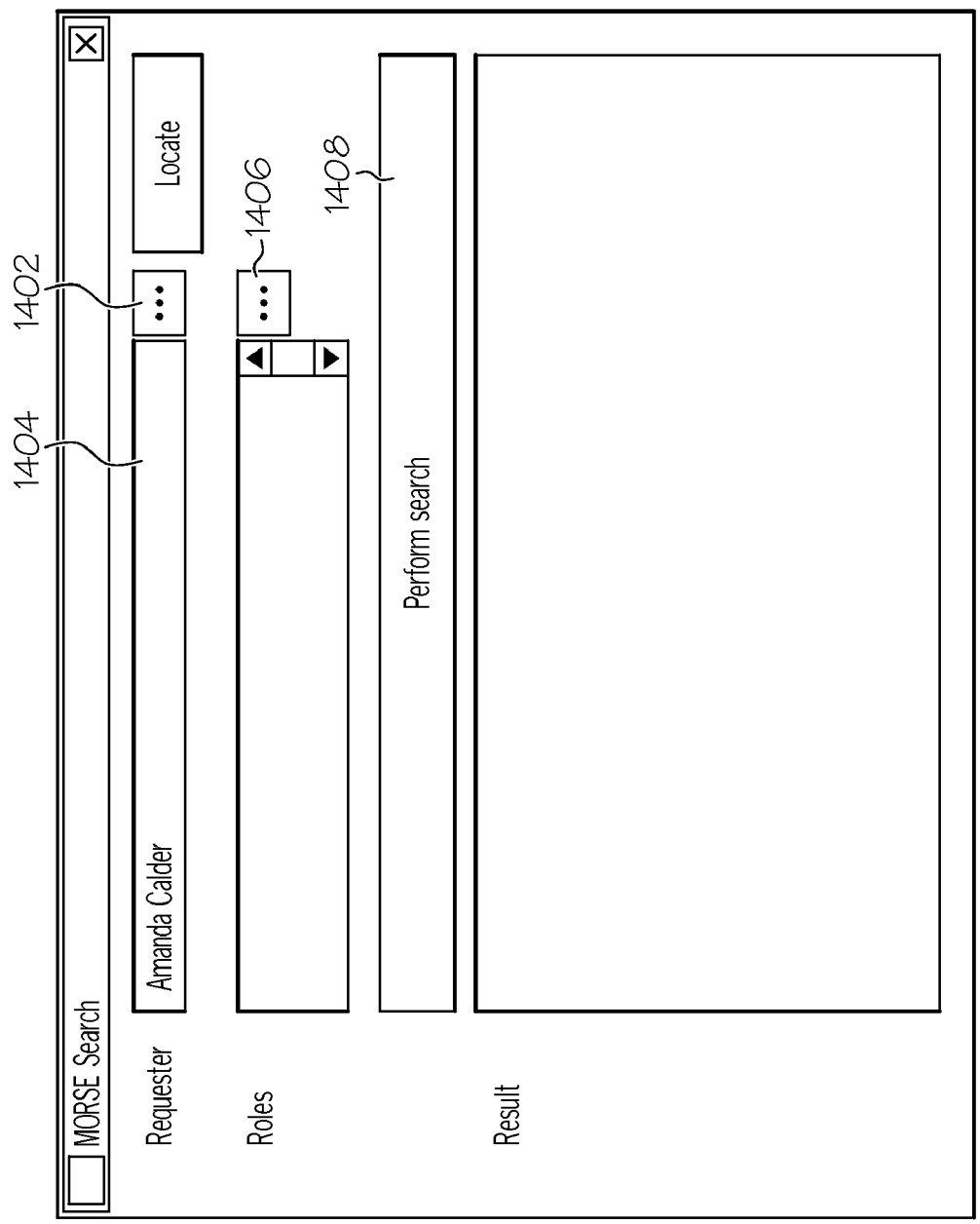
FIG. 14 illustrates the MORSE search window.

To perform a MORSE test in the Visual Planner, a user selects the MORSE search button 422 (FIG. 4) from the system toolbar. It should be noted that the user does not have to be in any specific view type to access the MORSE search tool. FIG. 14 illustrates the MORSE search window. The user can then choose the name of the requester by clicking on button 1402 of "Requester" field 1404.

Figure 15:
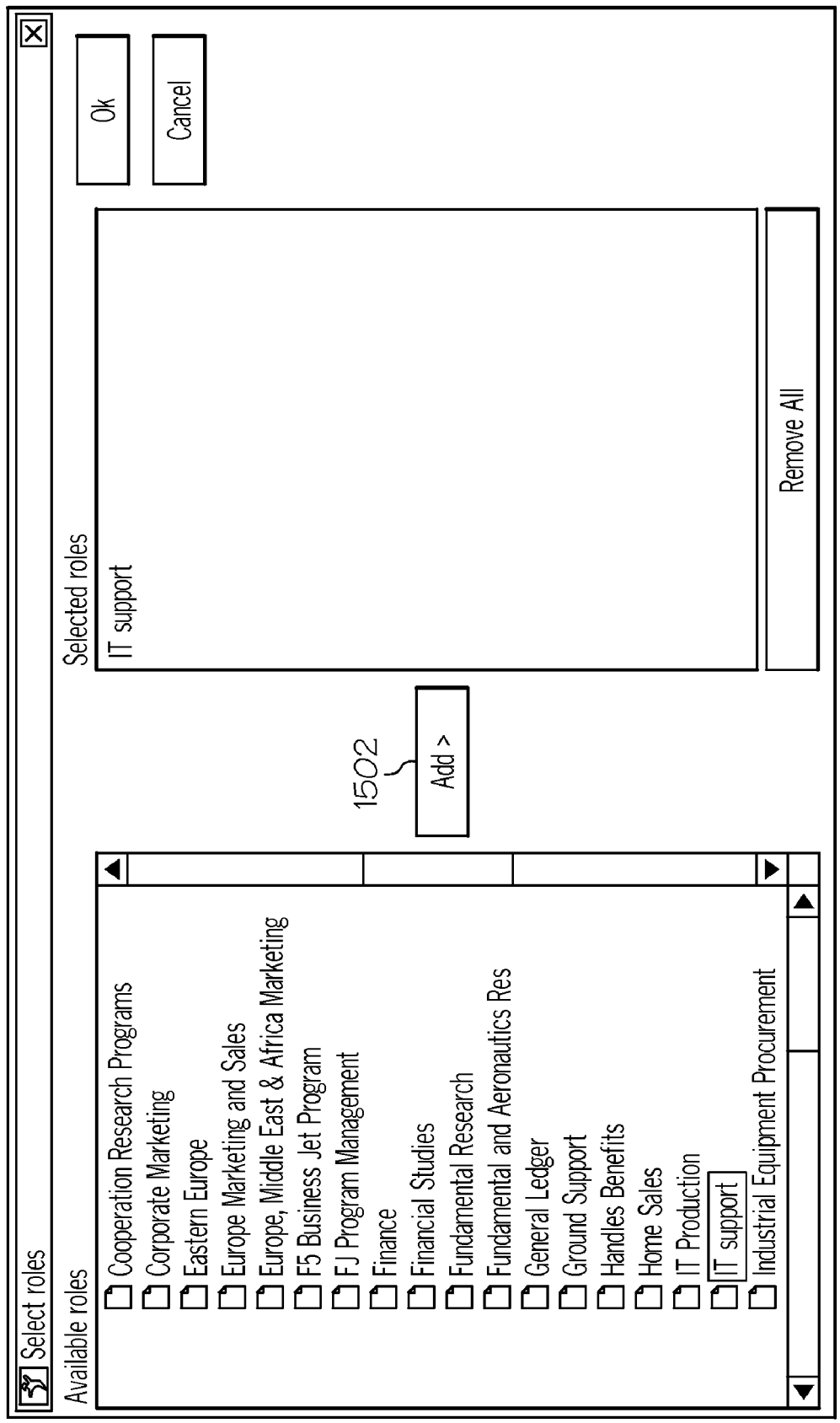
FIG. 15 illustrates the "select roles" window of the visual planner interface.

Next, the user selects the roles to be evaluated by the MORSE engine (relative to the requester) by clicking on a similar button the right of the "Roles" field. Another window will appear (FIG. 15) allowing the user to select from the available roles list (left) by clicking on the role to highlight and clicking on "Add" button 1502 in the center. Once users have selected all roles to be evaluated by MORSE, they close the window by choosing "Ok". Users can select multiple roles (hierarchical or functional) for evaluation. To complete the MORSE test, users choose "Perform Search" button 1408 (FIG. 14) from the main MORSE Search window.

Figure 16:
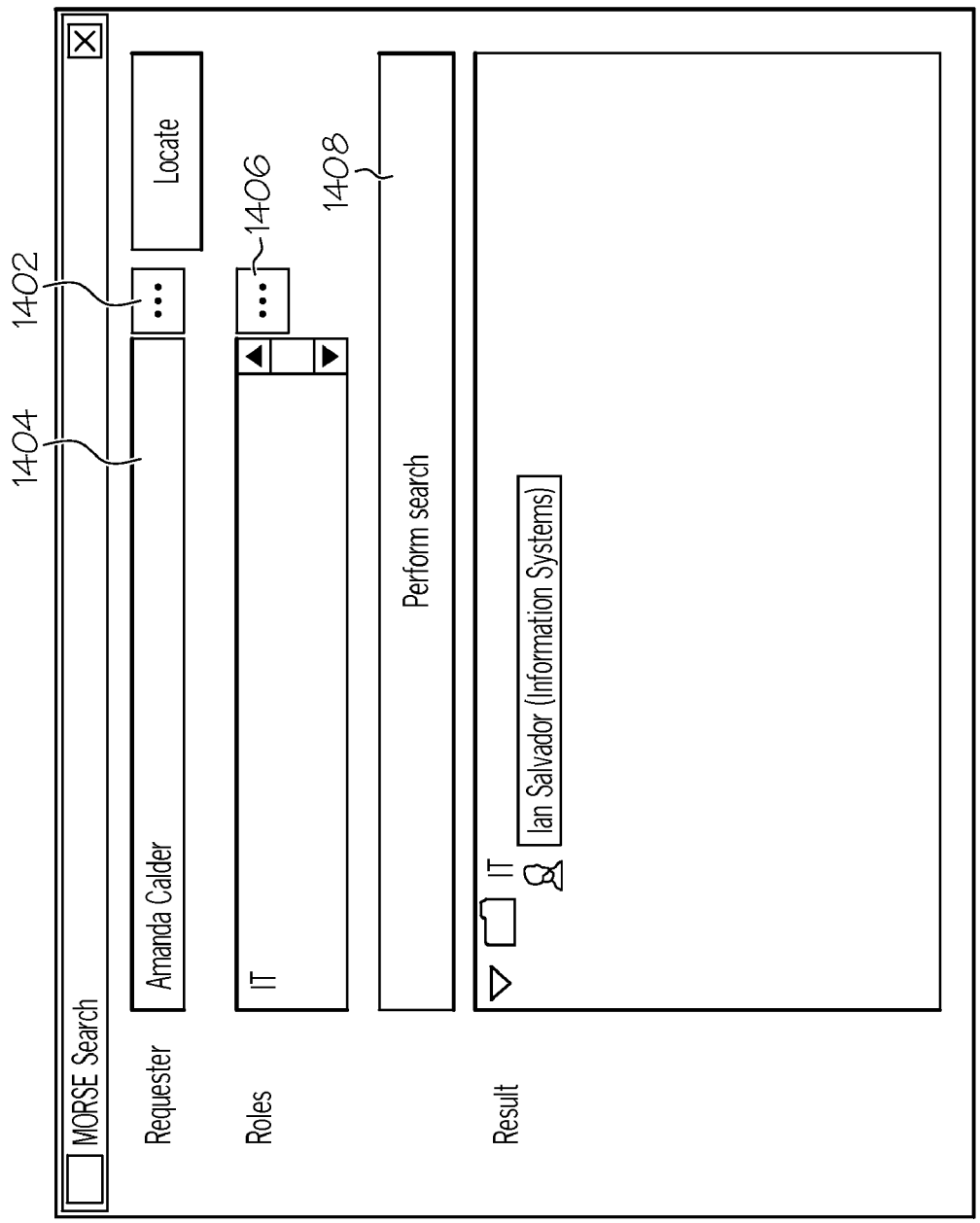
FIG. 16 illustrates the Morse search window after a search has been performed.

FIG. 16 illustrates the result of such a MORSE search. In the shown example, role evaluation for IT support relative to Amanda Calder (the requester) is tested. The MORSE Search tool returns Ian Salvador from the IT organization unit.

It should be noted that users are normally assigned to only one organization unit, though it is quite possible that they could work within several. A user may have only one hierarchical role, which corresponds to the level of authority (usually expressed as "title") in the organization.

Just as most employees (users) have multiple functions that they perform in an organization, users can have multiple functional roles. A functional role defines a skill or an ability to render a certain workflow service.

There are several ways to define users in the organization, some of which are given below:
 users can be added through Notes documents in the planner database;
 a users can be imported from an existing public address book;
 a user data can be extracted from external systems which maintain organizational information; and
 users can (and normally, will) be defined in the Visual Planner.

As users are added to the organization database, an opportunity to assign them to organization units, functional roles, and hierarchical roles exists. If one chooses not to do so as they are being added, or if the people are added to the organization database via one of the import or synchronization functions, one can always assign organization units and roles later.

Figure 17:
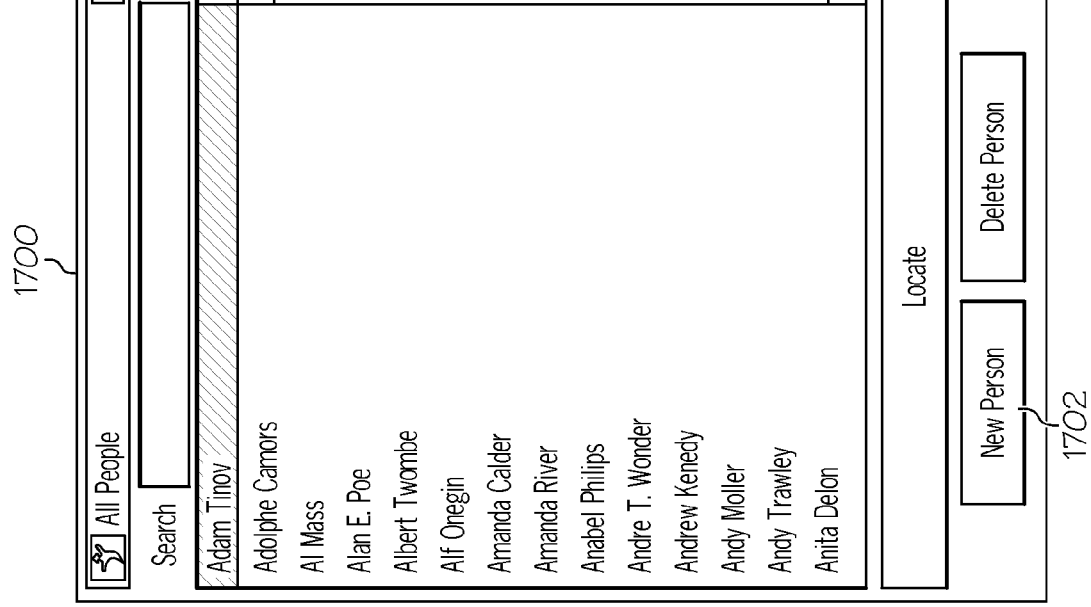
FIG. 17 illustrates the window for adding users in the visual planner interface.
Figure 18:
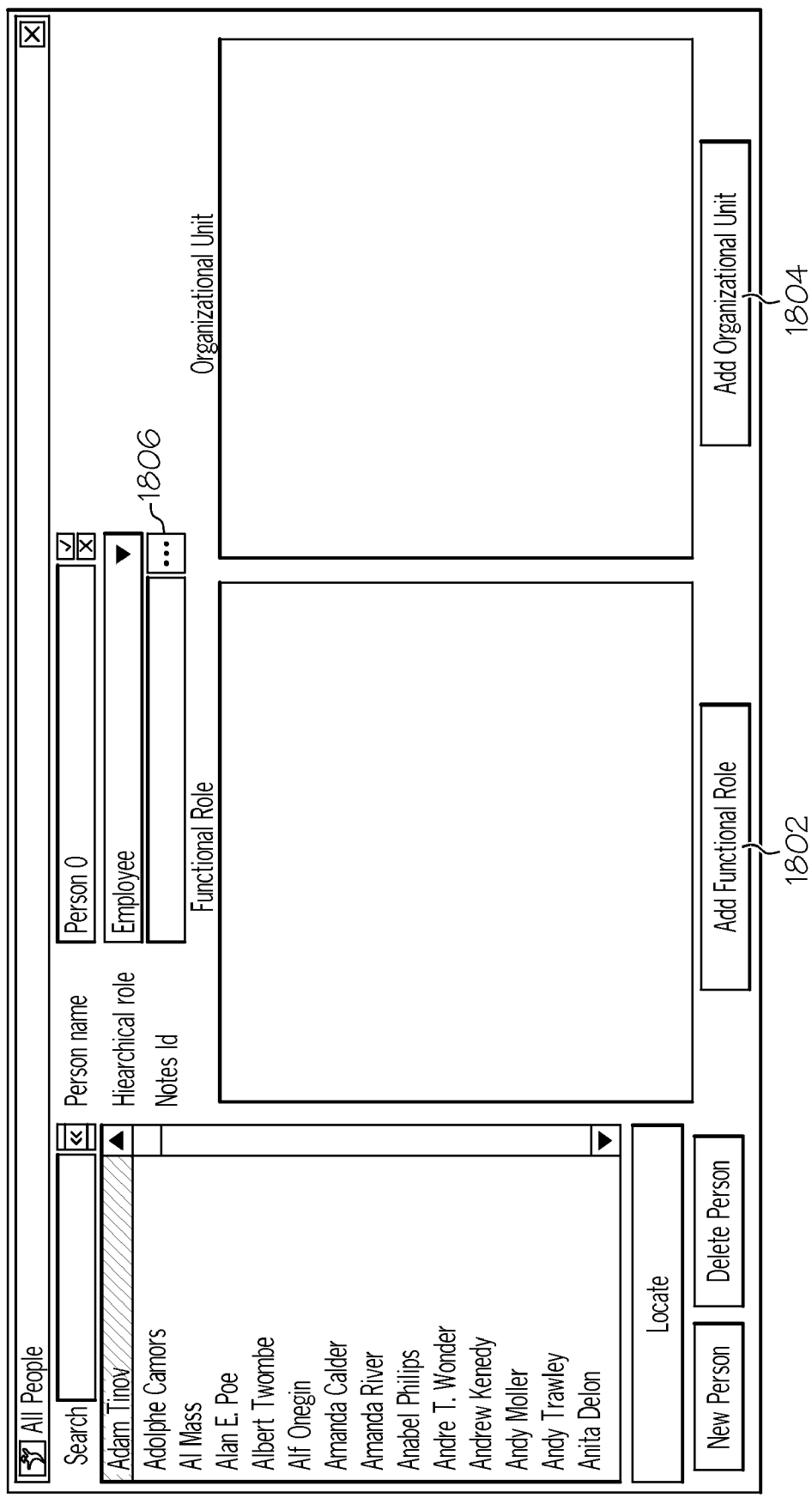
FIG. 18 illustrates the window in the visual planner interface for adding more information about users.

To define users in the Visual Planner, toolbar button 424 (FIG. 4) is used, which displays a dialog box similar to the one shown in FIG. 17. From within the dialog 1700, a user selects the option for "New Person" 1702, which prompts the user for additional information via another graphical interface shown in FIG. 18.

The user then changes the person's name to its proper value (from the generic name chosen automatically), and specifies a hierarchical role. Note that the user is only allowed to select a single hierarchical role. In addition, the user has the option to assign functional roles and organization units here as well, simply by using the buttons (1802 and 1804) listed at the bottom of the dialog box for those purposes. If users choose to, they may enter this information at a later time.

In order for the FlowBuilder Router to evaluate roles based on this user, they must have an assigned Notes User ID. The user either enters it here, or selects button 1806 to display a list of the defined users in the address book for selection.

Figure 19:
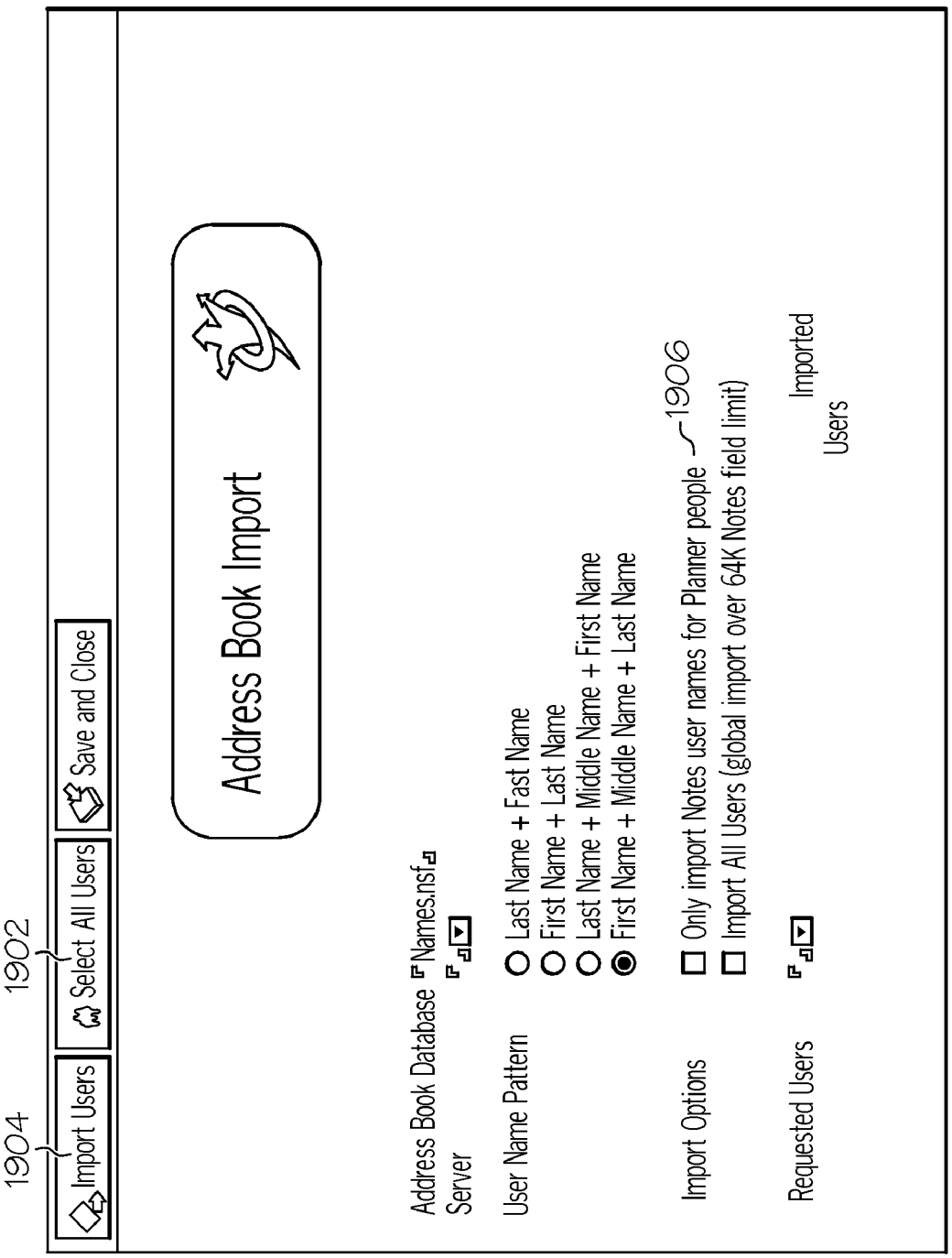
FIG. 19 illustrates the "Address Book Import" window of the visual planner interface.

To import users from a Notes Address Book, the user will use the import utility available through the Notes Actions menu—"Address Book Import". This document specifies the server and import options. FIG. 19 illustrates the Address Book Import document. Users have two options when choosing users for import from a specified database: they "Select All Users" (1902) or select individual users from the "Requested Users" drop-down box. Once users have selected users to be imported, they are ready to click on the "Import Users" (1904) button at the top of the Notes document. Importing users from an existing Notes Address Book will create a new Address Book, containing all register users in the Planner. It should be noted that to import Notes User Ids for users already defined in the Planner, users should select the "Only import Notes user names for Planner people" in the Import Options selection (2006). It should be also noted that in order for web users to authenticate, they must be registered in the Public Address Book, or some other cascaded Notes Address Book.

Therefore, the Visual Planner interface allows users to build a matrix-based representation of their organization. The MORSE algorithm of the present invention is used in the Visual Planner to route resources to persons with the right functional roles. Furthermore, a search can be performed in the Visual Planner to identify the right functional role for a given resource. Now a description of the components that comprise the Visual Planner is described from a system perspective.

Visual Planner Objects

The power of FlowBuilder lies in its innovative workflow engine, MORSE. MORSE evaluates organizational context at run-time by locating functional best match recipients.

FlowBuilder's workflow routing capabilities allow central maintenance of organization and process definitions in real-time. A further advantage of this approach is that workflow routing is externalized from all applications, eliminating the need to need to maintain workflow definitions or code in the applications themselves.

Figure 20:
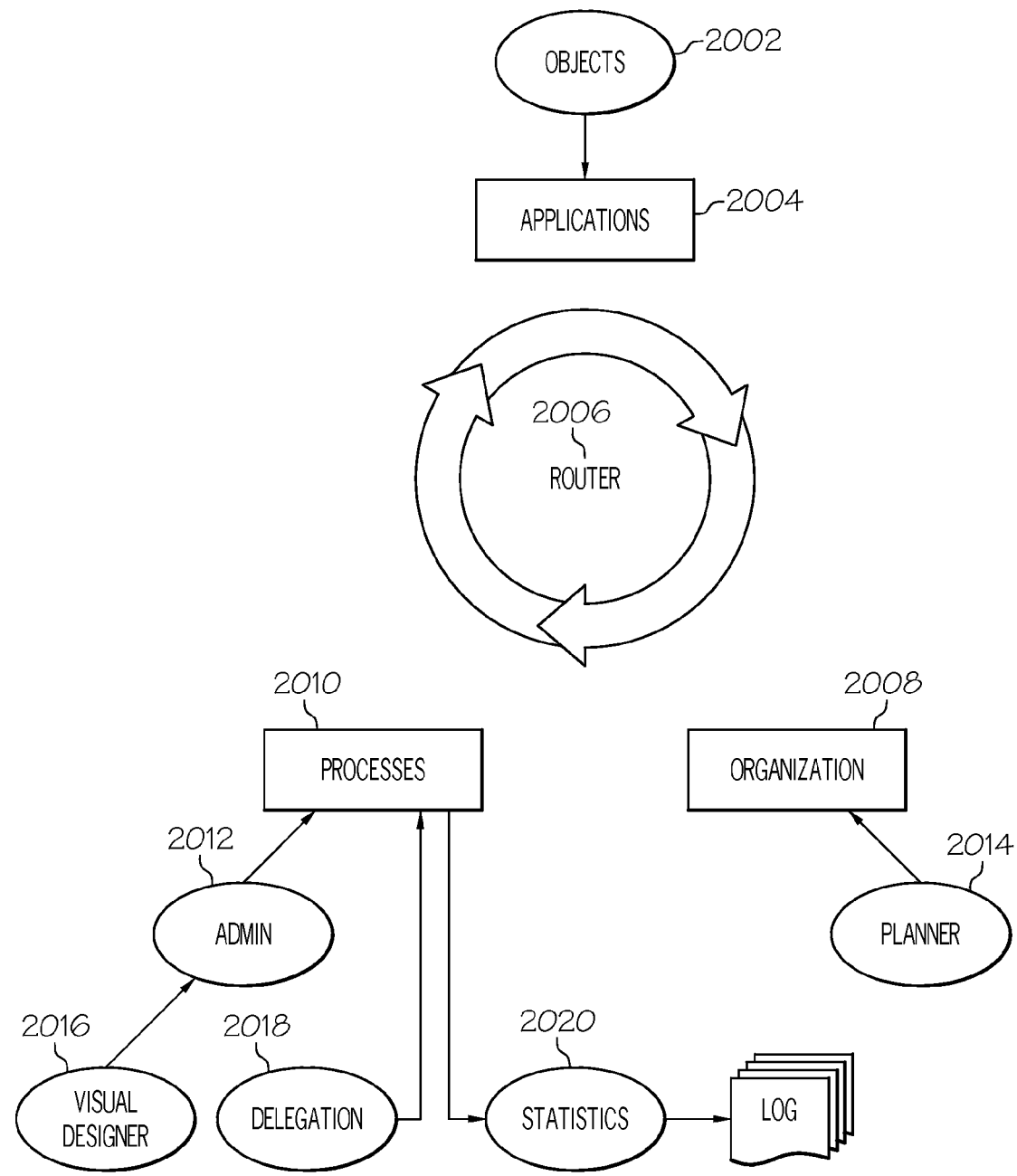
FIG. 20 illustrates system components of the automated workflow system.

FIG. 20 illustrates how a router interacts with FlowBuilder components to process workflow. Router 2006 polls the application databases for workflow requests and uses organizational and process data supplied by the FlowBuilder components, to bring the workflow cycle to completion. The FlowBuilder components act together to enable workflow functionality in applications. A discussion regarding the interaction among various components are given below:

FlowBuilder Objects—FlowBuilder objects 2002 is a database that contains all of the design elements needed to create an application-specific "Notes form". Adding the FlowBuilder generic subform and footer to an existing form provides the user interface and the technical fields necessary to run web-enabled workflow application 2004. There are two primary FlowBuilder subforms: the "FlowBuilder generic subform" and the "FlowBuilder generic footer".

FlowBuilder Planner—Planner 2014 is a database containing the definitions for client-specific organization models 2008, including hierarchy, structure and function. The Planner uses "functional roles" as recipients in your workflow rules. Roles are evaluated at run-time, using the organization data housed in the FlowBuilder Planner. "Functional links" allow users to extend their workflow process across organizations or between servicing/serviced units, without rigidly defined hierarchical links.

FlowBuilder Administration —Administration database 2012 is the centralized store for all workflow rules. Workflow events are stored as documents in the FlowBuilder administration database (fbadmin.nsf). Furthermore, Visual Designer 2016 is a web-based application that allows users to create complex workflow cycles with simple drag-and-drop operations. Workflow events are created and manipulated visually, using toolbars, and are assigned custom routing types or notification messages.

FlowBuilder Statistics—FlowBuilder statistics 2020 provide a complete audit trail of workflow processing 2010, as well as useful views for tracking workflow cycles by date, event, requester, or workflow actor. Standard reporting views include 'average processing time by event and user', 'daily load per user', and 'global load per user'. In another embodiment, reporting capabilities are extended with custom views or through data exports to other analytical tools.

FlowBuilder Delegation—FlowBuilder delegation 2018 is a self-service application that allows users to delegate tasks with a set of defined constraints. The delegation capability is particularly useful when re-routing events for temporary process changes. For example, a user may delegate specific tasks to another user while on vacation, thus preventing a bottleneck in the business process. Furthermore, FlowBuilder router 2006 uses the information stored in this database to determine the recipients, according to user-defined criteria.

The FlowBuilder Router—FlowBuilder Router 2006 is a JAVA® servelet that runs within the client's Domino server. The Router polls FlowBuilder databases, looking for workflow requests. Router processing times are based on workflow event priority (time intervals) defined in the Router Manager application. Workflow processing times can be altered in "real-time" without stopping router 2006. The client company's administrative group is able to access the Router Manager at the following URL: (http://<my_domino_server>/fb-manager).

FlowBuilder Sample Application—The sample application is a working example of how a FlowBuilder web-based workflow application functions. From the sample application, users are able to test routing in an organization and view the web client interface. The sample application can be accessed through a web browser at the following URL: (http://server_hostname/flowbuilder/fbsample.nsf).

The table (Table 1) set forth below provides an overview of the FlowBuilder components and the files associated with them:

TABLE 1

FlowBuilder Components

| Component | Installation Directory | File |
| --- | --- | --- |
| FlowBuilder Databases and FlowBuilder Objects Template | <Domino Server Directory>\data\flowbuilder | fbadmin.nsf<br>fbdeleg.nsf<br>fbhelp16.nsf<br>fbins16.nsf<br>fbobj16.nsf<br>fbplanr.nsf<br>fbsample.nsf<br>fbstats.nsf |
| FlowBuilder Router Manager | <Domino Server Directory>\data\domino\html | fbmanager.html<br>fblogo.gif |
| FlowBuilder Servelet components<br>FlowBuilder client Java applications | <Domino Server Directory>\data\domino\servelet<br><Notes Directory> | fbsrv16.jar<br>fbapp16.jar |

Therefore, Visual Planner objects are the building blocks of organization models. Using simple drag-and-drop operations, users can create complex matrix organization models in the Visual Planner.

A system and method has been shown in the above embodiments for the effective implementation of a method and system for automated network-enabled workflow management in a matrix organizational model. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware.

The above enhancements for a system and method for an automated network-enabled workflow management in a matrix organizational model, and its described functional elements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of workflow programming.

Although the present invention has been shown and described with respect to several preferred embodiments thereof, various changes, omissions and additions to the form and detail thereof, may be made therein, without departing from the spirit and scope of the invention.

What is claimed is:

1. A system for determining one or more best matching resources, given a resource x and role F, in a hierarchical matrix-based workflow model, said system comprising:
   at least one computing device including at least one processor, the at least one computing device being operable to:
   identify a need, Y, within an organization that requires a resource x;
   define a role F as being a resource category that can fulfill identified need Y, where said role F is represented as a node in a hierarchy;
   automatically iteratively search up an organizational hierarchical tree for roles F, where the searching steps through organizational nodes where subsequent nodes return roles that represent nodes with increasing hierarchical standing;
   identify at each organizational hierarchical node links to other organizational nodes outside the current hierarchical tree;
   return at least one role F in said iterative search that ends when the top of the hierarchy is reached;
   compare each role F in the hierarchy with the specific requirements of need Y to determine which role F best matches said requirements;
   return a role F and comparing the role F with the specific requirements of need Y to determine which role F best matches requirements; and
   store or display the best matching resources that have been identified as candidates to fill need Y.

2. The system of claim 1, wherein the hierarchical matrix-based workflow is a three-dimensional workflow comprising the following axes: organizational unit, title hierarchy, and functional roles.

3. A system for automated network-enabled workflow management in a hierarchical matrix organizational model, the hierarchical organizational model comprising one or more organizational units, the system comprising:
   at least one computing device including at least one processor;
   at least one database storing information regarding design elements required for creating an application, definitions of organizational models, and workflow rules;
   a search engine interfacing with the at least one database and utilizing the stored information to determine workflow routing in a matrix organizational model, the search engine having:
      a role extractor for identifying all roles associated with the organizational models;
      a functional link extractor for identifying all functional links associated with the organizational model;
      an inherited link extractor for identifying all links of hierarchically-superior roles associated with the organizational model, and
      a matcher for identifying appropriate recipient(s) by matching the workflow requests to the roles in organizational models while traversing a hierarchical tree of the organizational unit, and other organizational units based on the identified functional and inherited links; and
   a router polling the at least one database to retrieve workflow requests, and directing the workflow requests to appropriate recipient(s) based on the search engine determinations, wherein the appropriate recipient(s) may include recipients in other organizational units.

4. The system of claim 3, wherein the hierarchical matrix organizational model is a three dimensional model and the three dimensions comprise the following axes: organizational unit, title hierarchy, and functional roles.

5. The system of claim 3, wherein information regarding the design elements in the hierarchical organizational models is imported in any one of, or combination of, the following ways: via a local database, via a remote database, imported from an address book, or from another organizational model.

6. The system of claim 3, wherein the network comprises any of the following: local area network (LAN), wide area network (WAN), Internet, HTTP-based networks, or PSTN/PBX network.

7. The system of claim 3, wherein the search engine is a rules based search engine.

8. The system of claim 3, wherein the at least one database with definitions of organizational models further comprises definitions of hierarchy, structure, and function associated with organizational models.

9. The system of claim 3, further comprising:
   a statistical analyzer providing a complete statistical analysis of workflow processing including means for tracking workflow cycles by date, event, requestor, or workflow actor.

10. The system of claim 3, further comprising:
    an automated delegation system that allows users to delegate tasks for re-routing events for temporary process changes.

11. The system of claim 3, wherein the router is a JAVA servelet.

12. The system of claim 3, wherein the workflow rules are stored in a separate database.

13. The system of claim 3, wherein the workflow management is externalized from applications created using the information in the at least one database.

14. The system of claim 3, wherein the definitions of organizational models further include definitions of functional links that extend the workflow process across organizations without defining hierarchical links.

15. The system of claim 3, wherein the search engine follows as many links as needed to resolve the workflow requests by traversing a hierarchical tree of the organizational units in the organizational model, and identifying functional links to other organizations that service the organizational units.

* * * * *